United States Patent
Sun et al.

(10) Patent No.: US 9,181,371 B2
(45) Date of Patent: Nov. 10, 2015

(54) METHODS FOR PRODUCING POLYOLEFINS WITH CATALYST SYSTEMS

(71) Applicant: Univation Technologies, LLC, Houston, TX (US)

(72) Inventors: Lixin Sun, Sugar Land, TX (US); Francis C. Rix, Houston, TX (US); Sun-Chueh Kao, Pearland, TX (US); Parul A. Khokhani, Manalapan, NJ (US); Phuong A. Cao, Old Bridge, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/355,264

(22) PCT Filed: Nov. 6, 2012

(86) PCT No.: PCT/US2012/063704
§ 371 (c)(1),
(2) Date: Apr. 30, 2014

(87) PCT Pub. No.: WO2013/070602
PCT Pub. Date: May 16, 2013

(65) Prior Publication Data
US 2014/0288249 A1 Sep. 25, 2014

Related U.S. Application Data

(60) Provisional application No. 61/557,360, filed on Nov. 8, 2011.

(51) Int. Cl.
| | |
|---|---|
| C08F 4/646 | (2006.01) |
| C08F 4/653 | (2006.01) |
| C08F 4/642 | (2006.01) |
| C08F 4/6592 | (2006.01) |
| C08F 10/00 | (2006.01) |
| C08F 210/16 | (2006.01) |
| C08F 4/659 | (2006.01) |

(52) U.S. Cl.
CPC ........... *C08F 210/16* (2013.01); *C08F 4/65904* (2013.01); *C08F 10/00* (2013.01); *C08F 4/6592* (2013.01); *C08F 4/65925* (2013.01); *C08F 4/65927* (2013.01); *C08F 2500/05* (2013.01)

(58) Field of Classification Search
CPC ............ C08F 4/65904; C08F 4/64013; C08F 4/64089; C08F 4/65925; C08F 4/65927; C08F 10/00
See application file for complete search history.

(56) References Cited

U.S. PATENT DOCUMENTS

| | | | |
|---|---|---|---|
| 6,967,184 B2 | 11/2005 | Wenzel et al. | |
| 7,163,991 B2 | 1/2007 | Wenzel et al. | |
| 7,196,032 B2 | 3/2007 | Wenzel et al. | |
| 7,479,529 B2 | 1/2009 | Wenzel et al. | |

FOREIGN PATENT DOCUMENTS

| | | |
|---|---|---|
| EP | 0997480 | 5/2000 |
| WO | WO 94/10180 | 5/1994 |
| WO | WO 99/30819 | 6/1999 |
| WO | WO 2008/011266 | 1/2008 |

OTHER PUBLICATIONS

Pierino Zanella et al.: "Synthesis and characterization of bis(indenyl) zirconium aryloxide derivatives and their use in alpha-olefin polymerization," Applied Organometallic Chemistry, vol. 15, No. 8, Aug. 1, 2001 pp. 717-724.

*Primary Examiner* — Caixia Lu
(74) *Attorney, Agent, or Firm* — Brooks, Cameron & Huebsch, PLLC

(57) ABSTRACT

Described herein are methods comprising contacting one or more olefins with a catalyst system in a polymerization reactor at conditions sufficient to produce a polyolefin, wherein the catalyst system comprises a first metallocene catalyst compound comprising a first transition metal atom, two cyclopentadienyl ligands bound to the first transition metal atom, and two leaving groups bound to the first transition metal atom, wherein at least one leaving group is selected from the group consisting of a halo-phenoxy and a halo-alkoxy; wherein the first metallocene catalyst compound has a catalyst productivity that is at least 20% greater than a comparative metallocene catalyst compound used to produce the same polyolefin, wherein the comparative metallocene catalyst compound is the same as the first metallocene catalyst compound except neither leaving group is a halo-phenoxy or a halo-alkoxy.

13 Claims, No Drawings

METHODS FOR PRODUCING POLYOLEFINS WITH CATALYST SYSTEMS

CROSS-REFERENCE TO RELATED APPLICATIONS

This application is a National Stage application under 35 U.S.C. §371 of International Application No. PCT/US2012/063704, filed Nov. 6, 2012, that claims the benefit of Ser. No. 61/557,360, filed Nov. 8, 2011, the disclosures of which are incorporated by reference in their entireties.

BACKGROUND

A number of catalyst compositions containing single-site catalysts have been used to prepare polyolefins, producing relatively homogeneous copolymers. In contrast to traditional multi-site Ziegler-Natta catalyst compositions, single-site catalysts, such as metallocene catalysts, are catalytic compounds containing uniform polymerization sites.

To achieve acceptable and commercially viable polymerization activities with metallocene catalysts compounds, a large amount of activator such as methylaluminoxane ("MAO"), is often required. Unfortunately, such activators are expensive and the amount of activator required to produce an active catalyst for polymerization has been a substantial impediment to the commercialization of metallocene catalysts for polyolefin production. Therefore, there is a need for catalysts that have improved activity and productivity, and thus require less activator.

Mixed catalyst systems frequently include at least one metallocene catalyst compound to produce bimodal polyolefins. The production of bimodal polyolefins using a mixed catalyst system that includes at least one metallocene catalyst compound often require a large amount of activator and/or a large amount of the metallocene catalyst compound in order to produce commercial quantities of bimodal polyolefins. There is a need, therefore, for improved methods for producing bimodal polyolefins with mixed catalyst systems.

SUMMARY

Described herein are methods for producing polyolefins with catalyst systems that comprise a metallocene catalyst compound comprising at least one leaving group selected from a halo-phenoxy and a halo-alkoxy. The method may comprise contacting one or more olefins with a catalyst system in a polymerization reactor at conditions sufficient to produce a polyolefin, wherein the catalyst system comprises a first metallocene catalyst compound comprising a first transition metal atom, two cyclopentadienyl ligands bound to the first transition metal atom, and two leaving groups bound to the first transition metal atom, wherein at least one leaving group is selected from the group consisting of a halo-phenoxy and a halo-alkoxy; wherein the first metallocene catalyst compound has a catalyst productivity that is at least 20% greater than a comparative metallocene catalyst compound used to produce the same polyolefin, wherein the comparative metallocene catalyst compound is the same as the first metallocene catalyst compound but does not have a leaving group that is a halo-phenoxy or a halo-alkoxy and instead has methyl leaving groups.

The catalyst system may further comprise at least one of a non-metallocene catalyst compound and a second metallocene compound. In some embodiments the catalyst system may comprise the first metallocene catalyst compound and a non-metallocene catalyst compound that are combined external to the polymerization reactor to form a first metallocene/non-metallocene catalyst which is introduced to the reactor; and may further comprise a second metallocene catalyst compound that is introduced to the reactor separately from the first metallocene/non-metallocene catalyst compound. In some embodiments the catalyst system may comprise a non-metallocene catalyst compound a second metallocene catalyst compound that are combined external to the polymerization reactor to form a second metallocene/non-metallocene catalyst compound which is introduced to the reactor separately from the first metallocene catalyst compound. In some embodiments the catalyst system may comprise the first metallocene catalyst compound and a second metallocene catalyst compound, where the first and second metallocene catalysts compounds may be introduced to the reactor together or independently of one another.

DETAILED DESCRIPTION

Described herein are metallocene catalyst compounds that comprise a transition metal atom, at least two leaving groups bound to the first transition metal atom, wherein at least one leaving group is selected from halo-phenoxy and halo-alkoxy. It has been discovered that metallocene catalyst compounds having at least one halo-phenoxy or halo-alkoxy leaving group exhibit a substantial increase in catalyst productivity as compared to a comparative metallocene catalyst compound, where the comparative metallocene catalyst compound is the same as the halo-phenoxy or halo-alkoxy metallocene catalyst compound except the leaving groups are not a halo-phenoxy or a halo-alkoxy but rather comprise methyl groups.

The halo-phenoxy or halo-alkoxy metallocene catalyst compound can be used as part of a mixed catalyst system to produce a bimodal polyolefins. Thus, one or more bimodal polyolefins can be produced by polymerizing one or more olefins with the mixed catalyst system in a polymerization reactor. The term "bimodal" refers to a polymer or polymer composition, e.g., polyethylene, having a "bimodal molecular weight distribution." A "bimodal" composition can include a polyethylene component with at least one identifiable higher molecular weight component and a polyethylene component with at least one identifiable lower molecular weight component, e.g., two distinct peaks on an SEC curve. A material with more than two different molecular weight distribution peaks will be considered "bimodal" as that term is used although the material may also be referred to as a "multimodal" composition, e.g., a trimodal or even tetramodal composition.

In some embodiments, the mixed catalyst system can include, but is not limited to, a first metallocene catalyst compound and a non-metallocene catalyst compound. As used herein, the terms "metallocene," "metallocene catalyst," and "metallocene catalyst compound" are used interchangeably and refer to a compound having a first transition metal atom, two cyclopentadienyl ligands that are non-bridged or bridged with one another and bound to the first transition metal atom, and at least two leaving groups bound to the first transition metal atom. As described in more detail below, at least one leaving group in the first metallocene can be a halo-phenoxy or a halo-alkoxy. As used herein, the terms "non-metallocene," "non-metallocene catalyst," and "non-metallocene catalyst compound" are used interchangeably and refer to a catalyst compound having a second transition metal atom and a ligand that includes at least one Group 14, 15, or 16 atom, where the Group 14, 15, or 16 atom is bound to the second transition metal atom.

The first metallocene catalyst compound and/or the non-metallocene catalyst compound can be mixed, blended, or otherwise combined with a first activator and a second activator, respectively. The first and second activators can be the same or different. The first metallocene catalyst compound and/or the non-metallocene catalyst compound can be supported or unsupported on a first support and a second support, respectively. The first and second supports can be the same or different. Suitable activators and supports will be further discussed and described below.

In some embodiments, the mixed catalyst system can include, but is not limited to, a first metallocene catalyst compound and a second metallocene catalyst compound. In such embodiments, the first metallocene catalyst compound is as described below, and comprises at least one leaving group selected from a halo-phenoxy or a halo-alkoxy. The second metallocene catalyst compound is different from the first metallocene compound and does not comprise a halo-phenoxy or halo-alkoxy leaving group.

It has been discovered that the first metallocene catalyst compound having at least one halo-phenoxy or halo-alkoxy leaving group exhibits a substantial increase in catalyst productivity as compared to a comparative metallocene catalyst compound, where the comparative metallocene catalyst compound is the same as the first metallocene except the leaving groups are not a halo-phenoxy or a halo-alkoxy. For example, the leaving groups of the comparative metallocene catalyst can be a halogen, e.g., Cl, or an alkyl, e.g., methyl, instead of a halo-phenoxy or halo-alkoxy. The first metallocene catalyst compound having at least one halo-phenoxy or halo-alkoxy leaving group can have a catalyst productivity of about 20%, about 40%, about 60%, about 80%, about 100%, about 120%, about 140%, about 160%, about 180%, about 200%, about 220%, about 240%, about 260%, about 280%, about 300% or more, greater than a comparative metallocene catalyst comprising methyl leaving groups. In some embodiments, the increase in catalyst productivity of the first metallocene catalyst compound having at least one halo-phenoxy or halo-alkoxy leaving group as compared to the comparative metallocene comprising methyl leaving groups can exhibit an increase in catalyst productivity ranging from a low of about 20%, about 30%, about 50%, about 70%, or about 90%, to a high of about 190%, about 210%, about 230%, about 250%, about 270%, or about 290%, with suitable ranges comprising the combination of any lower amount and any upper amount. As such, a mixed catalyst system containing the first metallocene catalyst compound and a non-metallocene catalyst compound can exhibit increased catalyst productivity as compared to a comparative mixed catalyst system containing the same non-metallocene catalyst compound and the comparative metallocene catalyst compound that does not have at least one leaving group that is a halo-phenoxy or a halo-alkoxy.

The first metallocene catalyst compound can have a catalyst productivity of at least 20,000, at least 40,000, at least 60,000, at least 100,000, at least 150,000, or at least 200,000 grams polymer per millimole ("mmol") of the first metallocene catalyst compound. In another example, the first metallocene catalyst compound can have a catalyst productivity ranging from a low of about 20,000, about 30,000, about 50,000, about 70,000, or about 90,000, to a high of about 175,000, about 250,000, about 400,000, about 550,000, about 700,000, or about 800,000 grams polymer per mmol of the first metallocene catalyst compound, with suitable ranges comprising the combination of any lower productivity and any upper productivity. The first metallocene catalyst compound can have a catalyst productivity of at least 40,000 grams polymer per mmol of the first metallocene catalyst compound, or at least 60,000 grams polymer per mmol of the first metallocene catalyst compound, or at least 100,000 grams polymer per mmol of the first metallocene catalyst compound, or at least 200,000 grams polymer per mmol of the first metallocene catalyst compound, any one of which can be at least 20% greater, at least 40% greater, at least 60% greater, at least 80% greater, at least 100% greater, at least 120% greater, at least 140% greater, at least 160% greater, at least 180% greater, at least 200% greater, at least 220% greater, or at least 240% greater than the comparative metallocene catalyst compound, where the comparative metallocene catalyst compound is the same except the leaving groups of the comparative metallocene catalyst compound are methyl instead of halo-phenoxy or halo-alkoxy.

Polymerization Process

The metallocene catalyst compound having at least one halo-phenoxy or halo-alkoxy leaving group can be used to polymerize one or more olefins to produce one or more polyolefin products. A mixed catalyst system comprising a first metallocene catalyst compound having at least one halo-phenoxy or halo-alkoxy leaving group can be used to polymerize one or more olefins to produce one or more bimodal polyolefins or bimodal polyolefin products. Any polymerization process including, but not limited to, high pressure, solution, slurry, and/or gas phase processes can be used. Preferably, a continuous gas phase process utilizing a fluidized bed reactor is used to polymerize ethylene and/or propylene and/or one or more optional comonomers to provide a polyethylene or bimodal polyethylene.

When a mixed catalyst system is used, the first metallocene catalyst compound and the non-metallocene catalyst compound (or second metallocene compound) can be combined with one another external to the polymerization reactor or within the polymerization reactor. For example, the first metallocene and the non-metallocene catalyst compound (or second metallocene compound) can be combined with one another to produce the mixed catalyst system and the mixed catalyst system can be introduced to the polymerization reactor. Alternatively, the first metallocene and the non-metallocene catalyst compound (or second metallocene) can be independently or separately introduced to the polymerization reactor to produce the mixed catalyst system within the polymerization reactor. In some embodiments, the non-metallocene (or second metallocene) can be introduced to a first polymerization reactor and the first metallocene can be introduced to a second polymerization reactor serially connected to the first polymerization reactor or vice versa. As such, the non-metallocene (or second metallocene) can produce a first polyolefin and the metallocene can polymerize a second polyolefin and the first and second polyolefins can be combined within the second reactor to produce the bimodal polyolefin.

The first metallocene and the non-metallocene catalyst compound (or second metallocene) can be combined with one another in any desired ratio or amount. The first metallocene and the non-metallocene catalyst compound (or second metallocene) can be used to polymerize the one or more olefins independent of one another in any desired ratio or amount.

For example, a molar ratio of the non-metallocene catalyst compound to the first metallocene catalyst compound (moles non-metallocene divided by moles first metallocene) can range from a low of about 0.05, about 0.1, about 0.2, about 0.3, about 0.5, about 0.7, or about 1 to a high of about 3, about 5, about 7, about 9, about 11, about 13, about 16, about 18, or about 20, with suitable ranges comprising the combination of any lower amount and any upper amount. In another example, the molar ratio of the non-metallocene catalyst compound to the first metallocene catalyst compound can range from about 0.1 to about 10, or about 0.3 to about 5, or about 0.5 to about 2.

The mixed catalyst system can have a non-metallocene catalyst compound to first metallocene catalyst compound molar ratio that is greater than that of a comparative mixed catalyst system for producing the same polyolefin, where the comparative mixed catalyst system is the same as the mixed catalyst system except the leaving groups of the metallocene in the comparative catalyst system are not a halo-phenoxy or a halo-alkoxy but instead are methyl. For example, the non-metallocene catalyst compound to first metallocene catalyst compound molar ratio of the mixed catalyst system can be about 10%, about 20%, about 30%, about 40%, about 50%, about 60%, about 70%, about 80%, about 90%, or about 100% greater than the non-metallocene catalyst compound to metallocene catalyst compound molar ratio of the comparative mixed catalyst system. In another example, the non-metallocene catalyst compound to first metallocene catalyst compound molar ratio of the mixed catalyst system can be about 10% to about 20%, or about 40% to about 60%, or about 80% to about 100% greater than the non-metallocene catalyst compound to metallocene catalyst compound molar ratio of the comparative mixed catalyst system. In a more particular example, if the non-metallocene catalyst compound to first metallocene catalyst compound molar ratio of the mixed catalyst system is about 0.67, such molar ratio can be at least about 20% greater than the non-metallocene catalyst compound to metallocene catalyst compound molar ratio of the comparative mixed catalyst system.

In some embodiments, the mixed catalyst system can comprise at least three catalyst compounds. For example, the non-metallocene can be mixed, blended, or otherwise combined with another or "second" metallocene catalyst compound to provide a non-metallocene/second metallocene catalyst mixture, where the second metallocene can be same or different from the first metallocene. For example, the second metallocene can have leaving groups other than a halo-phenoxy and halo-alkoxy. The non-metallocene/second metallocene catalyst mixture can be combined with the first metallocene catalyst compound external to the polymerization reactor to provide the mixed catalyst system. The non-metallocene/second metallocene catalyst mixture and the first metallocene can be separately or independently introduced to the polymerization reactor to provide the mixed catalyst system within the polymerization reactor.

If the non-metallocene catalyst compound is combined with a second metallocene catalyst compound, the non-metallocene catalyst compound to second metallocene catalyst compound molar ratio can widely vary. For example, the non-metallocene catalyst compound can be combined with the second metallocene catalyst compound at a molar ratio (moles non-metallocene divided by moles second metallocene) ranging from a low of about 1, about 1.5, or about 2 to a high of about 3, about 5, about 10, about 20, about 30, about 50, or about 100, with suitable ranges comprising the combination of any lower amount and any upper amount. In another example, the molar ratio of the non-metallocene catalyst compound to second metallocene catalyst compound can range from about 1 to about 6, about 1.5 to about 4.5, about 2 to about 4, or about 2.5 to about 3.5.

The amount of the first metallocene catalyst compound relative to non-metallocene catalyst compound and/or the amount of the first metallocene catalyst compound relative to the non-metallocene/second metallocene catalyst mixture can be held constant and/or can vary with respect to one another. In other words, the first metallocene catalyst compound of the mixed catalyst system can be utilized as a "supplemental" or "trim" catalyst to produce the bimodal polyethylene. The amount of the first metallocene catalyst compound can be controlled during polymerization of the one or more olefins to tailor, modify, control, or otherwise adjust one or more properties of the bimodal polyolefin. For example, adjusting the amount of the first metallocene catalyst compound relative to the non-metallocene catalyst compound and/or the amount of the first metallocene catalyst compound relative to the non-metallocene/second metallocene catalyst mixture can control a molecular weight split, the average molecular weight, the melt index, melt index ratio, or any combination thereof, of the bimodal polyolefin. In another example, adjusting the amount of the first metallocene catalyst compound relative to the non-metallocene catalyst compound and/or the amount of the first metallocene catalyst compound relative to the non-metallocene/second metallocene catalyst mixture can control the melt index of the bimodal polyolefin.

A suitable fluidized bed reactor can include a reaction zone and a so-called velocity reduction zone. The reaction zone can include a bed of growing polymer particles, formed polymer particles and a minor amount of catalyst particles fluidized by a continuous flow of gaseous monomer(s) and, optionally a diluent to remove heat of polymerization through the reaction zone. Optionally, some of the re-circulated gases can be cooled and compressed to form liquids that increase the heat removal capacity of the circulating gas stream when readmitted to the reaction zone. A suitable rate of gas flow can be readily determined by simple experiment. Make-up of gaseous monomer to the circulating gas stream can be at a rate equal to the rate at which particulate bimodal polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust can be removed in a cyclone and/or fines filter. The gas can be passed through a heat exchanger where at least a portion of the heat of polymerization can be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202.

The reactor temperature of the fluid bed process can range from about 30° C. or about 40° C. or about 50° C. to about 90° C. or about 100° C. or about 110° C. or about 120° C. or about 150° C. In general, the reactor temperature can be operated at the highest feasible temperature taking into account the sintering temperature of the bimodal polymer product within the reactor. Regardless of the process used to make the bimodal polyolefins, the polymerization temperature or reaction temperature should be below the melting or "sintering" temperature of the bimodal polyolefins to be formed. Thus, the upper temperature limit in some embodiments is the melting temperature of the bimodal polyolefin produced in the reactor.

Hydrogen gas can also be used in the olefin polymerization to modify the final properties of the polyolefin. Using certain catalyst systems, increasing concentrations (partial pressures) of hydrogen can increase the flow index (FI) of the polyolefin generated. The flow index can thus be influenced by the hydrogen concentration. For example, a concentration of hydrogen within the reactor can be adjusted to control at least one of the density and the melt index ($I_2$) of the bimodal polyethylene. In another example, at least one comonomer comprising one or more $C_4$ to $C_8$ alpha olefins can be contacted with the mixed catalyst system in the polymerization reactor, and at least one of a concentration of the one or more $C_4$ to $C_8$ alpha olefins and a concentration of hydrogen within the polymerization reactor can be adjusted to control at least one of the density and the melt index ($I_2$) of the polyethylene.

The amount of hydrogen in the polymerization process can be expressed as a mole ratio relative to the total polymerizable monomer, for example, ethylene, or a blend of ethylene and hexene or propylene. The amount of hydrogen used in the polymerization process can be an amount sufficient to achieve the desired flow index of the final bimodal polyolefin. For example, the mole ratio of hydrogen to total monomer ($H_2$:monomer) can be in a range from greater than 0.0001, or greater than 0.0005, or greater than 0.001, to less than 10, or less than 5, or less than 3, or less than 0.10, where a desirable range can include any combination of any upper mole ratio limit with any lower mole ratio limit described herein. Expressed another way, the amount of hydrogen in the reactor at any time can range to up to 5,000 ppm, or up to 4,000 ppm, or up to 3,000 ppm, and between 50 ppm and 5,000 ppm, or between 50 ppm and 2,000 ppm. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm, with suitable ranges comprising the combination of any lower amount and any upper amount. In yet another embodiment, the ratio of hydrogen to total monomer ($H_2$:monomer) can be about 0.00001:1 to about 2:1, about 0.005:1 to about 1.5:1, or about 0.0001:1 to about 1:1.

The pressure in the reactor of a gas phase process (either single stage or two or more stages) can vary from about 690 kPa to about 3,450 kPa, or be in the range from about 1,380 kPa to about 2,759 kPa, or be in the range from about 1,724 kPa to about 2,414 kPa.

The gas phase reactor can be capable of producing from about 10 kg of polymer per hour to about 90,900 kg/hr, or greater than about 455 kg/hr, or greater than about 4,540 kg/hr, or greater than about 11,300 kg/hr, or greater than about 15,900 kg/hr, or greater than about 22,700 kg/hr, or from about 29,000 kg/hr to about 45,500 kg/hr.

A slurry polymerization process can also be used. A slurry polymerization process generally uses pressures in the range of from about 101 kPa to about 5,070 kPa and even greater and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene and comonomers and often hydrogen along with catalyst are added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed can be liquid under the conditions of polymerization and relatively inert. When a propane medium is used the process should be operated above the reaction diluent critical temperature and pressure. In one embodiment, a hexane, isopentane, or isobutane medium can be employed.

In the polymerization processes discussed and described herein, it may also be desired to additionally use one or more static control agents or continuity additives to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst compound(s) being used. For example, the use of static control agents is described in European Patent No. 0229368 and U.S. Pat. Nos. 4,803,251; 4,555,370; and 5,283,278.

In some embodiments, static control agents such as aluminum stearate may be employed. The static control agent used may be selected for its ability to receive the static charge in the fluidized bed without adversely affecting or substantially affecting productivity. Other suitable static control agents may also include aluminum distearate, ethoxylated amines, and anti-static compositions such as those provided by Innospec, Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives, such as polyethyleneimines having the following general formula:

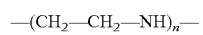

$$—(CH_2—CH_2—NH)_n—$$

where n may be from about 10 to about 10,000. The polyethyleneimines may be linear, branched, or hyperbranched (i.e., forming dendritic or arborescent polymer structures). They can be a homopolymer or copolymer of ethyleneimine or mixtures thereof (referred to as polyethyleneimine(s) hereafter). Although linear polymers represented by the chemical formula —[CH$_2$ CH$_2$ NH]— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name Lupasol.

Another useful continuity additive can include a mixture of aluminum distearate and an ethoxylated amine type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt % to about 50 wt % or about 10 wt % to about 40 wt %, or about 15 wt % to about 30 wt %. Other useful static control agents and additives are disclosed in U.S. Patent Application Publication No. 2008/0045663.

The continuity additive(s) or static control agent(s) may be added to the reactor in an amount ranging from about 0.05 to about 200 ppm, based on the weight of all feeds to the reactor, excluding recycle, more preferably in an amount ranging from about 2 to about 100 ppm; more preferably from about 4 to about 50 ppm in yet other embodiments.

The term "bimodal polyethylene" refers to a bimodal polymer having at least 50 wt % ethylene-derived units, preferably at least 70 wt % ethylene-derived units, more preferably at least 80 wt % ethylene-derived units, or at least 90 wt % ethylene-derived units, or at least 95 wt % ethylene-derived units, or 100 wt % ethylene-derived units. The bimodal polyethylene can thus be a homopolymer or a copolymer, including a terpolymer, having one or more other monomeric units.

The term "bimodal polypropylene" refers to a bimodal polymer having at least 50 wt % propylene-derived units, preferably at least 70 wt % propylene-derived units, more preferably at least 80 wt % propylene-derived units, or at least 90 wt % propylene-derived units, or at least 95 wt % propylene-derived units, or 100 wt % propylene-derived units. The bimodal propylene can thus be a homopolymer or a copolymer, including a terpolymer, having one or more other monomeric units.

The bimodal polyethylene and/or bimodal polypropylene described herein can, for example, include at least one or more other olefins) or "comonomer(s)." Suitable comonomers can be olefins that contain from 3 to 16 carbon atoms; or from 3 to 12 carbon atoms; or from 4 to 10 carbon atoms; or from 4 to 8 carbon atoms. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

The terms "high molecular weight polyethylene component," "high molecular weight component," and "HMWC" refer to the polyolefin component in the bimodal composition that has a higher molecular weight than the molecular weight of at least one other polyolefin component in the same composition. When the composition includes more than two components, e.g., a trimodal composition, then the high molecular weight component is to be defined as the component with the highest weight average molecular weight.

The high molecular weight component can have a weight average molecular weight (Mw) of from about 400,000 to about 950,000. For example, the weight average molecular weight (Mw) of a high molecular weight polyethylene component can range from a low of about 450,000, about 500,000, about 600,000, about 650,000, or about 700,000 to a high of about 750,000, about 820,000, about 860,000, about 875,000, about 900,000, or about 925,000, with suitable ranges comprising the combination of any lower amount and any upper amount.

The terms "low molecular weight polyethylene component," "low molecular weight component," and "LMWC" refer to the polyolefin component in the composition that has a lower molecular weight than the molecular weight of at least one other polyolefin component in the same composition. When the composition includes more than two components, e.g., a trimodal composition, then the low molecular weight component is to be defined as the component with the lowest weight average molecular weight.

The low molecular weight component can have a weight average molecular weight (Mw) from about 3,000 to about 100,000. For example, the weight average molecular weight (Mw) of a low molecular weight polyethylene component can range from a low of about 3,000, about 5,000, about 10,000, about 15,000, about 20,000, or about 25,000 to a high of about 30,000, about 35,000, about 40,000, about 45,000, about 55,000, or about 65,000, with suitable ranges comprising the combination of any lower amount and any upper amount. In some embodiments, the weight average molecular weight (Mw) of the low molecular weight polyethylene component can range from about 25,000 to about 40,000, or about 26,000 to about 40,000, or about 27,000 to about 38,000, or about 28,000 to about 36,000, or about 30,000 to about 35,000.

The terms "split" and "molecular weight split" refer to the weight percent (wt %) of the high molecular weight polyethylene component in the bimodal composition. Thus, it describes the relative amount of the high molecular weight component against the low molecular weight component in a bimodal polyethylene composition, including any of the polymer compositions described herein. The weight percent (wt %) of each component can also be represented by the area of each molecular weight distribution curve that is seen after deconvolution of the overall molecular weight distribution curve.

The split of the bimodal polyethylene composition can range from a low of about 10 wt %, about 20 wt %, or about 30 wt % to a high of about 40 wt %, about 50 wt %, about 60 wt %, or about 70 wt %, with suitable ranges comprising the combination of any lower amount and any upper amount. For example, the split of the bimodal polyethylene composition can range from about 30 wt % to about 60 wt % or from about 32 wt % to about 40 wt %.

The term "spread" refers to the ratio of the weight average molecular weight of the high molecular weight fraction or component, sometimes referred to as $MW_{HMW}$, to the weight average molecular weight of the low molecular weight fraction or component, sometimes referred to as $MW_{LMW}$. The "spread" can therefore also be expressed as the ratio of $MW_{HMW}:MW_{LMW}$. The weight average molecular weight of each component can be obtained by deconvolution of an overall SEC curve, i.e., an SEC curve of an entire composition as discussed below.

The spread of the bimodal polyethylene composition can range from a low of about 15, about 17, or about 19, or about 20, about 21, about 22, about 23, or about 24, to a high of about 27, about 28, about 29, about 30, about 31, about 32, or about 35, with suitable ranges comprising the combination of any lower amount and any upper amount.

The number average (Mn), weight average (Mw), z-average (Mz), and Z+1 average (Mz+1) molecular weights are terms that refer to the molecular weight values for the entire composition (e.g., the blended composition), as opposed to that of any individual component, unless specifically noted otherwise. The number average, weight average, z-average, and z+1 average molecular weight values encompass any value as determined by any published method. A preferred method uses any published deconvolution procedure, e.g., any published technique for elucidating each individual polymer component's molecular information in a bimodal polymer. A particularly preferred technique uses a Flory deconvolution, including but not limited to the Flory procedures set forth in U.S. Pat. No. 6,534,604, which is incorporated by reference herein. Any program that incorporates the principles contained in the following reference is useful: P. J. Flory, Principles of Polymer Chemistry, Cornell University Press, New York 1953. Any computer program capable of fitting an experimental molecular weight distribution with multiple Flory or log-normal statistical distributions is useful. The Flory distribution can be expressed as follows:

$$Y = A_o \left(\frac{M}{M_n}\right)^2 e^{\left(-\frac{M}{M_n}\right)}$$

In this equation, Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www.solver.com can be used to perform the minimization. Using this program, special constraints can be placed on the individual Flory distributions that allow one to fit chromatograms of experimental blends and bimodal distributions.

Bimodal distributions can be fit within two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2, 3, 4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components.

The bimodal polyethylene composition may have a weight average molecular weight (Mw) of from about 150,000 to about 600,000. For example, the weight average molecular weight (Mw) of the bimodal polyethylene composition can range from a low of about 200,000, about 225,000, about 250,000, or about 275,000 to a high of about 350,000, about 375,000, about 400,000, about 450,000, or about 500,000, with suitable ranges comprising the combination of any lower amount and any upper amount.

Preferably, the bimodal polyethylene composition has a z-average molecular weight (Mz) of about 1,500,000 Daltons or more, or about 1,750,000 Daltons or more. For example, the bimodal polyethylene composition may have a z-average molecular weight (Mz) ranging from about 2,000,000 Daltons to about 3,500,000 Daltons, or from about 1,800,000 Daltons to about 4,000,000 Daltons. In another example, the bimodal polyethylene composition can have a z-average molecular weight (Mz) that ranges from a low of about 1,700,000, about 1,850,000, about 1,950,000, or about 2,150,000 to a high of about 2,500,000, about 2,900,000, about 3,100,000, about 3,300,000, or about 3,500,000, with suitable ranges comprising the combination of any lower amount and any upper amount.

The bimodal polyethylene composition can have a z+1-average molecular weight (Mz+1) of about 2,000,000 Daltons or more, about 3,000,000 Daltons or more, or about 4,000,000 Daltons or more. For example, the bimodal polyethylene composition may have a z+1-average molecular weight (Mz+1) from about 2,000,000 Daltons to about 6,000,000 Daltons, or from about 3,500,000 Daltons to about 5,500,000 Daltons. In another example, the bimodal polyethylene composition can have a z+1-average molecular weight (Mz+1) that ranging from a low of about 2,000,000, about 3,000,000, or about 4,000,000 Daltons to a high of about 4,500,000, about 5,500,000, about 6,000,000 Daltons, with suitable ranges comprising the combination of any lower amount and any upper amount.

The term "MWD" (molecular weight distribution) means the same thing as "PDI" (polydispersity index). The term "MWD" (PDI) is intended to have the broadest definition that persons in the pertinent art have given that term as reflected in one or more printed publications or issued patents. The MWD (PDI) is the ratio of weight-average molecular weight (Mw) to number-average molecular weight (Mn), i.e., Mw/Mn.

The bimodal polyethylene composition can have an Mw/Mn ratio of less than about 50, preferably less than about 45, or 40, or 38, or 37, or 36, or 35. For example, the MWD of the bimodal polyethylene composition can range from a low of about 10, about 15, about 17, or about 20 to a high of about 30, about 35, about 39, or about 42, with suitable ranges comprising the combination of any lower amount and any upper amount. In another example, the MWD of the bimodal polyethylene composition can range from about 20 to about 35, or from about 22 to about 33, or from about 24 to about 36, or from about 25 to about 35.

Density can be determined in accordance with ASTM D-792. In ASTM D-792 the density is measured by displacement where the specimens are cut from compression molded plaques that were cooled at a rate of 15° per minute, the instrument is zeroed without the specimen, the specimen is placed in the clamp and weighted out of the water, the specimen is then submerged in water for 60 seconds and then reweighed. The instrument calculates the density using the weight of the specimen in the air and the weight of the specimen submerged, using the density of air, water, and a clamp correlation factor. Density is expressed as grams per cubic centimeter (g/cm$^3$) unless otherwise noted. The bimodal polyethylene composition can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. For example, the bimodal polyethylene can have a density ranging from about 0.935 g/cm$^3$ to about 0.955 g/cm$^3$, or about 0.940 g/cm$^3$ to about 0.955 g/cm$^3$, or about 0.945 g/cm$^3$ to about 0.950 g/cm$^3$.

The bimodal polyethylene composition can have a bulk density, measured in accordance with ASTM D1895 method B, of from about 0.25 g/cm$^3$ to about 0.5 g/cm$^3$. For example, the bulk density of the bimodal polyethylene composition can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

The bimodal polyethylene composition can have a melt index or "MI" ($I_2$) of about 0.01 g/10 min to about 10 g/10 min. For example, the bimodal polyethylene composition can have a melt index ranging from a low of about 0.03 g/10 min, or about 0.05 g/10 min to a high of about 1 g/10 min or 5 g/10 min. The melt index ($I_2$) can be measured in accordance with ASTM D-1238-E (at 190° C., 2.16 kg weight).

The bimodal polyethylene composition can have a flow index ($I_5$) of about 0.03 g/10 min to about 20 g/10 min. For example, the bimodal polyethylene composition can have a flow index ($I_5$) ranging from a low of about 0.1 g/10 min, about 0.15 g/10 min, or about 0.2 g/10 min to a high of about 1.0 g/10 min, about 3.0 g/10 min, or about 10 g/10 min, with suitable ranges comprising the combination of any lower amount and any upper amount. For example, the bimodal polyethylene composition can have a flow index ($I_5$) of from about 0.1 g/10 min to about 5 g/10 min, or from about 0.2 g/10 min to about 4 g/10 min, or from about 0.3 g/10 min to about 3 g/10 min. The flow index ($I_5$) can be measured in accordance with ASTM D1238 (at 190° C., 5.0 kg weight).

The bimodal polyethylene composition can have a flow index ($I_{21}$) ranging from about 5 g/10 min to about 50 g/10 min. For example, the bimodal polyethylene composition can have a flow index ($I_{21}$) ranging from a low of about 5 g/10 min, about 6 g/10 min, or about 7 g/10 min to a high of about 10 g/10 min, about 20 g/10 min, or about 40 g/10 min, with suitable ranges comprising the combination of any lower amount and any upper amount. In another example, the bimodal polyethylene composition can have a flow index ($I_{21}$) of about 5 g/10 min to about 30 g/10 min, or from about 6 g/10 min to about 20 g/10 min, or from about 6 g/10 min to about 10 g/10 min. The flow index ($I_{21}$) can be measured in accordance with ASTM D-1238-F (at 190° C., 21.6 kg weight).

The term "Melt Index Ratio" or "MIR" or "$I_{21}/I_5$" as used herein refers to the ratio of $I_{21}$ to $I_5$. The bimodal polyethylene composition can have a MIR of about 25 to about 100. For example, the bimodal polyethylene composition can have a MIR ranging from about 30 to about 60, or about 33 to about 50, or about 36 to about 42.

The bimodal polyethylene can be suitable for such articles as pipes, films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers, and toys, etc.

Metallocene Catalyst Compounds

As noted above, the first metallocene catalyst compound can include a first transition metal atom, two cyclopentadienyl ligands that are non-bridged or bridged with one another and bound to the first transition metal atom, and at least two leaving groups bound to the first transition metal atom. At least one of the two leaving groups bound to the first transition metal atom can be a halo-phenoxy or a halo-alkoxy.

Metallocene catalyst compounds having two Cp ligands are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can also be referred to as "full sandwich" compounds having two or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced therewith permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically comprise atoms selected from Groups 13 to 16 atoms, and, in a some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. In some embodiments, the Cp ligand(s) are selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The transition metal atom "M" of the metallocene catalyst compound can be selected from Groups 3 through 12 atoms and lanthanide Group atoms; or selected from the Groups 3 through 10 atoms; or selected from Sc, Ti, Zr, Hf, V, Nb, Ta, Mn, Re, Fe, Ru, Os, Co, Rh, Ir, and Ni; or selected from Group 4, 5, and 6 atoms; or selected from Ti, Zr, Hf atoms; or is Zr; or is Hf. The oxidation state of the metal atom "M" can range from 0 to +7; or can be +1, +2, +3, +4 or +5; or can be +2, +3 or +4. The groups bound to the metal atom "M" are such that the compounds described below in the formulas and structures are electrically neutral, unless otherwise indicated. The Cp ligand(s) forms at least one chemical bond with the metal atom M to form the "metallocene catalyst compound." The Cp ligands are distinct from the leaving groups bound to the catalyst compound in that they are not highly susceptible to substitution/abstraction reactions.

Suitable metallocene catalyst compounds can be represented by formula (I):

$$Cp^A Cp^B MX_n \quad \quad \quad (I)$$

where M is as described above; each X is chemically bonded to M; each Cp group is chemically bonded to M; and n is 0 or an integer from 1 to 4, and either 1 or 2 in a particular exemplary embodiment.

The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in formula (I) as well as ring substituents in formula (II), discussed and described below, include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) and (II) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl and the like. In some embodiments, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent group R such as 1-butanyl can form a bonding association to the element M.

Each X in the formula (I) above and for formula (II) below is independently selected from: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, $C_1$ to $C_{12}$ heteroatom-containing hydrocarbons, and substituted derivatives thereof, a halo-phenoxy, and a halo-alkoxy; or is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, $C_7$ to $C_{18}$ fluoroalkylaryls, a halo-phenoxy, and a halo-alkoxy; or is selected from hydride, chloride, fluoride, methyl, phenyl, phenoxy, benzoxy, tosyl, a halo-phenoxy, and a halo-alkoxy; or is selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, $C_1$ to $C_{12}$ heteroatom-containing alkylaryls, a halo-phenoxy, and a halo-alkoxy; or is selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, halogenated $C_7$ to $C_{18}$ alkylaryls, a halo-phenoxy, and a halo-alkoxy; or is selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls), a halo-phenoxy, and a halo-alkoxy; or is selected from a halo-phenoxy and a halo-alkoxy.

Other non-limiting examples of X groups include amines, phosphines, ethers, carboxylates, dienes, hydrocarbon radicals having from 1 to 20 carbon atoms, fluorinated hydrocarbon radicals (e.g., $—C_6F_5$ (pentafluorophenyl)), fluorinated alkylcarboxylates (e.g., $CF_3C(O)O^-$), hydrides, halogen ions, and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis (N-methylanilide), dimethylamide, dimethylphosphide radicals, and the like. In some embodiments, two or more X's form a part of a fused ring or ring system. In some embodiments, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

For the first metallocene, at least one X in formula (I) and (II) is either a halo-phenoxy or a halo-alkoxy. Preferably n is 2 and both of the leaving groups (X) of the first metallocene are a halo-phenoxy and/or a halo-alkoxy. The at least one halo-phenoxy and/or halo-alkoxy can be derived from the corresponding halo-alcohol, i.e., the corresponding halo-phenol or halo-alkanol. Illustrative halo-alcohols can include, but are not limited to, fluoromethanol; chloromethanol; bromomethanol; iodomethanol; difluoromethanol; dichloromethanol; dibromomethanol; diiodomethanol; trifluoromethanol; trichloromethanol; tribromomethanol; triiodomethanol; 2,2,2-trifluoroethanol; 2,2,2-trichloroethanol; 2,2,2-tribromoethanol; 2,2,2-triiodoethanol; 2,2,3,3,3-pentafluoropropanol; 2,2,3,3,3-pentachloropropanol; 2,2,3,3,3-pentabromopropanol; 2,2,3,3,3-pentaiodopropanol; 2,2,2-trifluoro-1-trifluoromethylethanol; 2,2,2-trichloro-1-trichloromethylethanol; 2,2,2-tribromo-1-tribromomethylethanol; 2,2,2-triiodo-1-triiodomethylethanol; 1,1,1,3,3,3-hexafluoro-2-trifluoromethylpropanol; 1,1,1,3,3,3-hexachloro-2-trichloromethylpropanol; 1,1,1,3,3,3-hexabromo-2-tribromomethylpropanol; 1,1,1,3,3,3-hexaiodo-2-triiodomethylpropanol; one or more halo-phenols; or any combination thereof. Illustrative halo-phenols can include, but are not limited to, 2-fluorophenol; 3-fluorophenol; 4-fluorophenol; 2-chlorophenol; 3-chlorophenol; 4-chlorophenol; 2-bromophenol; 3-bromophenol; 4-bromophenol; 2-iodophenol; 3-iodophenol; 4-iodophenol; 2,6-difluorophenol; 3,5-difluorophenol; 2,6-dichlorophenol; 3,5-dichlorophenol; 2,6-dibromophenol; 3,5-dibromophenol; 2,6-diiodophenol; 3,5-diiodophenol; 2,4,6-trifluorophenol; 2,4,6-trichlorophenol; 2,4,6-tribromophenol; 2,4,6-triiodophenol; pentafluorophenol; pentachlorophenol; pentabromophenol; pentaiodophenol; 2-(trifluoromethyl)phenol; 3-(trifluoromethyl)phenol; 4-(trifluoromethyl)phenol; 2,6-di(trifluoromethyl)phenol; 3,5-di (trifluoromethyl)phenol; 2,4,6-tri(trifluoromethyl)phenol; 2-cyanophenol; 3-cyanophenol; 4-cyanophenol; 2-nitrophenol; 3-nitrophenol; 4-nitrophenol, or any combination thereof. In some embodiments, the halo-alcohol can be one or more fluoro-alcohols selected from fluoromethanol; difluoromethanol; trifluoromethanol; 2,2,2-trifluoroethanol; 2,2,3,3,3-pentafluoropropanol; 2,2,2-trifluoro-1-trifluoromethylethanol; 1,1,1,3,3,3-hexafluoro-2-trifluoromethylpropanol; 1,1,1,3,3,3-hexafluoro-2-propanol; 2-fluorophenol; 3-fluorophenol; 4-fluorophenol; 2,3-difluorophenol; 2,4-difluorophenol; 2,5-difluorophenol; 2,6-difluorophenol; 3,4-difluorophenol; 3,5-difluorophenol; 2,3,4-trifluorophenol; 2,3,5-trifluorophenol; 2,3,6-trifluorophenol; 2,4,6-trifluorophenol; 3,4,5-trifluorophenol; 2,3,5,6-tetrafluorophenol; pentafluorophenol; 2-(trifluoromethyl)phenol; 3-(trifluoromethyl)phenol; 4-(trifluoromethyl)phenol; 2,6-di(trifluoromethyl)phenol; 3,5-di(trifluoromethyl)phenol; 2,4,6-tri(trifluoromethyl)phenol; or any combination thereof. In some embodiments, the fluoro-alcohol can be or include pentafluorophenol. Preferably, at least one X in formula (I) and (II), when representing the first metallocene, is a fluoro-phenoxy, e.g., pentafluorophenoxy. Preferably, both leaving groups (X) in formula (I) and (II), when representing the first metallocene, are a fluoro-phenoxy, e.g., pentafluorophenoxy.

The metallocene catalyst compound includes those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above (for formula (I)) including halogen radicals and iron. In some embodiments, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$, where "=" represents two chemical bonds, R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In some embodiments, the bridged metallocene catalyst compound of formula (II) includes two or more bridging groups (A). In some embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls comprise from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N and O, Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be either cis-, trans-, or a combination thereof.

A cyclic bridging group (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from those having 4 to 10, more particularly 5, 6, or 7 ring members such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms.

The ligands $Cp^A$ and $Cp^B$ of formula (I) and (II) can be different from each other. The ligands $Cp^A$ and $Cp^B$ of formula (I) and (II) can be the same.

It is contemplated that the metallocene catalyst components discussed and described above or elsewhere herein can include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

Specific examples of suitable first metallocene catalyst compounds can include, but are not limited to, (tetramethylcyclopentadienyl)(n-propylcyclopentadienyl)zirconium bis(pentafluorophenoxide); bis(n-butylcyclopentadienyl)zirconium bis(pentafluorophenoxide); bis(n-propylcyclopentadienyl)hafnium bis(pentafluorophenoxide); bis(3-n-butyl-1-methyl cyclopentadienyl)zirconium bis(pentafluorophenoxide); rac-$Me_2Si$(tetrahydroindenyl)$_2$Zr bis(pentafluorophenoxide); or any combination thereof.

Specific examples of suitable second metallocenes can include, but are not limited to, (tetramethylcyclopentadienyl)(n-propylcyclopentadienyl)zirconium $Cl_2$, (tetramethylcyclopentadienyl)(n-propylcyclopentadienyl)zirconium $(CH_3)_2$, bis(n-butylcyclopentadienyl) zirconium $Cl_2$; bis(n-propylcyclopentadienyl)hafnium $(CH_3)_2$, bis(n-propylcyclopentadienyl) hafnium $F_2$, bis(n-propylcyclopentadienyl) hafnium $Cl_2$, bis(3-n-butyl-1-methyl cyclopentadienyl) zirconium $Cl_2$, rac-$Me_2Si$(tetrahydroindenyl)$_2ZrCl_2$, or any combination thereof.

In addition to the metallocene catalyst compounds discussed and described above, other metallocenes suitable for use in the first metallocene catalyst compound can include, but are not limited to, metallocenes described in U.S. Pat. Nos. 7,741,417; 7,179,876; 7,169,864; 7,157,531; 7,129,302; 6,995,109; 6,958,306; 6,884,748; 6,689,847; and WO Publications WO 97/22635; WO 00/699/22; WO 01/30860; WO 01/30861; WO 02/46246; WO 02/50088; WO 04/026921; and WO 06/019494, where at least one leaving group is a halo-phenoxy or a halo-alkoxy.

Preparation of the first metallocene catalyst compound having one or more halo-phenoxy and/or halo-alkoxy leaving groups can include reacting a metallocene compound with one or more halo-alcohols under conditions sufficient to cause at least one leaving group of the metallocene to be replaced by a halo-phenoxy or a halo-alkoxy leaving group. The metallocene can be combined with the halo-alcohol at ambient temperature and pressure. For example, the metallocene can be combined with the halo-alcohol and heated to a temperature ranging from a low of about 30° C., about 40° C., or about 50° C., to a high of about 70° C., about 85° C., or about 100° C. For example, the metallocene can be combined with the halo-alcohol and reacted therewith at a temperature ranging from a low of about −20° C., about 0° C., about 10°

C., or about 20° C., to a high of about 40° C., about 60° C., about 80° C., or about 100° C. The metallocene can be combined with the halo-alcohol at a pressure ranging from a low of about 50 kPa, about 101 kPa, or about 150 kPa, to a high of about 500 kPa, about 1,000 kPa, or about 2,000 kPa.

Depending on the particular conditions at which the halo-alcohol and the metallocene are combined to produce the first metallocene catalyst compound, the halo-alcohol can be a solid, liquid, gas, or a combination thereof. For example, the halo-alcohol can be combined with the metallocene under conditions sufficient to provide a liquid halo-alcohol. In another example, the halo-alcohol can be combined with the metallocene under conditions sufficient to provide a gaseous halo-alcohol.

The amount of the halo-alcohol reacted with the metallocene can be sufficient to provide a molar ratio of the halo-alcohol to the transition metal atom of the metallocene ranging from a low of about 1, about 1.5, about 2, about 2.5, about 3, about 3.5, or about 5, to a high of about 10, about 12, about 14, about 16, about 18, or about 20, with suitable ranges comprising the combination of any lower amount and any upper amount. For example, the molar ratio of the halo-alcohol to the transition metal atom of the metallocene can range from about 1 to about 10, or about 1 to about 5, or about 1 to about 2.

As noted above, the first metallocene catalyst compound and/or the second metallocene catalyst compound can be combined with one or more activators. The amount of the activator combined with the metallocene (the first and/or second metallocene catalyst compounds) can widely vary. The amount of the activator to the metallocene catalyst compound can range from about 1:1 to about 100,000:1, based on the moles of the activator to the moles of the metallocene catalyst compound. For example, the amount of activator in can range from a low of about 2:1, about 5:1, about 10:1, about 25:1, about 50:1, or about 100:1, to a high of about 500:1, about 1,000:1, about 5,000:1, or about 10,000:1, based on the moles of the activator to the moles of the metallocene catalyst compound, with suitable ranges comprising the combination of any lower amount and any upper amount.

Any two or more components of the first metallocene catalyst compound, e.g., the metallocene, the one or more halo-alcohols, the optional activator and/or the optional support, can be combined together in any combination, order, or sequence to produce the first metallocene catalyst compound. For example, the metallocene and the halo-alcohol can be combined to produce a metallocene/halo-alcohol mixture. The metallocene and the halo-alcohol can react to produce the first metallocene. The first metallocene produced by reacting the metallocene and the halo-alcohol can be introduced to the polymerization reactor. Optionally, a support and/or activator can be combined with the first metallocene. In another example, the metallocene, halo-alcohol, and the optional activator and/or support can each be added independently or separately to the polymerization reactor to produce the first catalyst compound within the reactor. In another example, the metallocene, the halo-alcohol, and activator can be combined to produce a metallocene/halo-alcohol/activator mixture that can react to produce the first metallocene catalyst compound. The first metallocene catalyst compound can be introduced to the polymerization reactor, independent from or combined with the support, if present. In another example, the metallocene, the halo-alcohol, and support can be combined to produce a first metallocene/halo-alcohol/support mixture that can react to produce the first metallocene catalyst compound. The first metallocene/halo-alcohol/support mixture can be introduced to the polymerization reactor independent from or combined with the activator, if present. In another example, the metallocene, the halo-alcohol, activator, and support can be combined with one another and reacted to produce the first metallocene catalyst compound, which can be introduced to the polymerization reactor.

One or more diluents or carriers can be used to facilitate the combination of any two or more components of the first metallocene catalyst compound. For example, the metallocene and the halo-alcohol can be combined together in the presence of one or more hydrocarbons. Suitable hydrocarbon diluents can include compounds having anywhere from about 4 carbon atoms to about 20 carbon atoms. Illustrative diluents can include, but are not limited to, linear and/or branched alkanes such as ethane, propane, butane, isobutene, pentane, isopentane, hexane, heptane, octane, decne, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as mineral oil, gasoline, kerosene, light oils, and the like. Similarly, halogenated hydrocarbons such as methylene chloride, dichloromethane, chlorobenzne, and the like, can also be used. Any two or more diluents can be used together to provide the diluent.

One or more promoters can be used to accelerate and/or otherwise facilitate the reaction between the metallocene and the one or more halo-alcohols to produce the first metallocene catalyst compound. Illustrative promoters can be or include, but are not limited to, one or more compounds having the formula RLi, wherein R is a $C_1$ to $C_{15}$ alkyl group; one or more compounds having the formula RMgX, where R is $C_1$ to $C_{15}$ alkyl group and X is Cl, Br, or I; one or more amines; or any combination thereof. For example, one or more amines can be combined with the metallocene, e.g., a metallocene having halide leaving groups, and the halo-alcohol to facilitate the formation of the first metallocene catalyst compound. In another example, one or more amines can be combined with the first metallocene, the halo-alcohol, and one or more diluents, e.g., toluene.

The amount of the one or more promoters combined with the metallocene can be sufficient to provide a molar ratio of the promoter to metallocene (moles amine divided by moles metallocene) ranging from a low of about 0.1, about 0.5, about 1, about 1.5, or about 2 to a high of about 5, about 7, about 9, or about 11, with suitable ranges comprising the combination of any lower amount and any upper amount. For example, the molar ratio of the promoter, e.g., amine, to the metallocene can range from about 2 to 6, or about 3 to 5, or about 3.5 to about 4.5, or about 1.5 to about 6, or about 1.5 to about 3, or about 1.8 to about 2.4, or about 1.9 to 2.1.

Suitable amines can include, but are not limited to, primary amines ("$NH_2R_1$"), secondary amines ("$NHR_1R_2$"), and tertiary amines ("$NR_1R_2R_3$"), where each $R_1$, $R_2$, and $R_3$ is independently selected from alkyls, cycloalkyls, heterocloalkyls, aryls, heteroaryls, and substituted aryls. In at least one example, the amine can be or include one or more tertiary amines. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, iso-propyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine Suitable compounds having the formula RLi, can include, but are not limited to, MeLi, n-BuLi, sec-BuLi, or any combination thereof. Suitable compounds having the formula RMgX can include, but are not limited to, n-BuMgCl, sec-BuMgCl, sec-BuMgBr, or any combination thereof.

Any two or more components of the first metallocene can be mixed, blended, stirred, rolled, or otherwise contacted with one another under a wide range of conditions. For example, any two or more components of the first metallocene can be can be rolled or otherwise contacted for a period of time ranging from about 1 minute to about 30 hours. Any two or more components of the catalyst system can be rolled or otherwise contacted at a temperature ranging from a low of about −20° C., about 0° C., about 10° C., or about 20° C. to a high of about 40° C., about 60° C., about 80° C., or about 100° C. Any two or more components of the catalyst system can be rolled or otherwise mixed under an inert atmosphere such as argon and/or nitrogen.

Non-Metallocene Catalyst Compound

The non-metallocene catalyst compound of the mixed catalyst system can include one or more Group 15 metal-containing catalyst compounds. The Group 15 metal-containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group. The non-metallocene compound can also include one or more activators or "second" activators.

In some embodiments, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with formulas (III) or (IV):

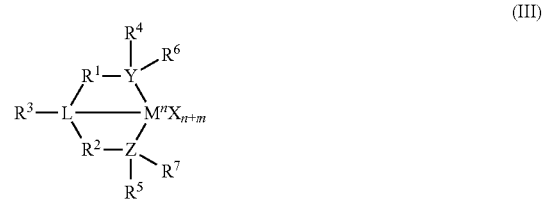

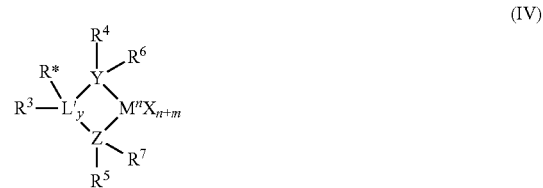

where M is a Group 3 to 12 transition metal or a Group 13 or 14 main group metal, preferably a Group 4, 5, or 6 metal, and more preferably a Group 4 metal, and most preferably zirconium, titanium or hafnium; each X is independently a leaving group, preferably, an anionic leaving group, and more preferably hydrogen, a hydrocarbyl group, a heteroatom or a halogen, and most preferably an alkyl; y is 0 or 1 (when y is 0 group L' is absent); n is the oxidation state of M, preferably +3, +4, or +5, and more preferably +4; m is the formal charge of the YZL or the YZL' ligand, preferably 0, −1, −2 or −3, and more preferably −2; L is a Group 15 or 16 element, preferably nitrogen; L' is a Group 15 or 16 element or Group 14 containing group, preferably carbon, silicon or germanium; Y is a Group 15 element, preferably nitrogen or phosphorus, and more preferably nitrogen; Z is a Group 15 element, preferably nitrogen or phosphorus, and more preferably nitrogen; $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ can also be interconnected to each other; $R^3$ is absent or a hydrocarbon group, hydrogen, a halogen, a heteroatom containing group; preferably a linear, cyclic or branched alkyl group having 1 to 20 carbon atoms, more preferably $R^3$ is absent, hydrogen or an alkyl group, and most preferably hydrogen; $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, and/or $R^4$ and $R^5$ may be interconnected to each other; $R^6$ and $R^7$ are independently absent, hydrogen, an alkyl group, halogen, heteroatom, or a hydrocarbyl group, preferably a linear, cyclic or branched alkyl group having 1 to 20 carbon atoms, and more preferably absent, and $R^*$ is absent, or is hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following formula (V):

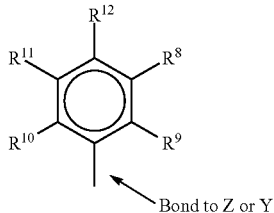

(V)

where $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In one or more embodiments, $R^4$ and $R^5$ are both a group represented by the following formula (VI):

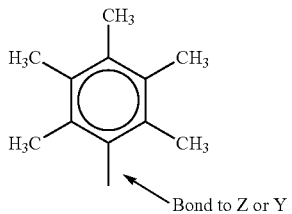

(VI)

where M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

The Group 15 metal-containing catalyst compound can be represented by the formula (VII):

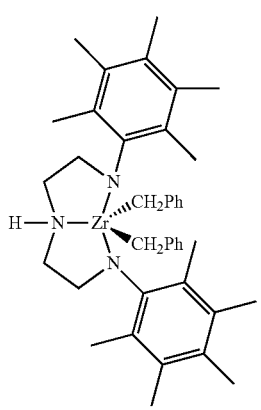

(VII)

where Ph equals phenyl. In at least one example, the Group 15-containing metal compound catalyst can be or include [(2,3,4,5,6 Me5C6N)CH2CH2]2NHZrBz2, where Bz is a benzyl group. Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

The mixed catalyst system can also include one or more other or third catalyst compounds. Suitable additional catalyst compounds can include, but are not limited to chromium catalysts, Ziegler-Natta catalysts, a second metallocene catalyst, a second non-metallocene catalyst, and conventional-type transition metal catalysts.

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Conventional-type transition metal catalysts are those traditional Ziegler-Natta catalysts that are well known in the art. These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3/AlCl_3$ and $Ti(OCl_2H_{25})Cl_3$.

Catalysts derived from Mg/Ti/Cl/THF can be used. One example of the general method of preparation of such a catalyst includes the following: dissolve $TiCl_4$ in THF, reduce the compound to $TiCl_3$ using Mg, add $MgCl_2$, and remove the solvent. Specific examples of other conventional-type transition metal catalysts are discussed in more detail in U.S. Pat. Nos. 4,115,639; 4,077,904; 4,482,687; 4,564,605; 4,721,763; 4,879,359; and 4,960,741. Conventional-type transition metal catalyst compounds based on magnesium/titanium electron-donor complexes are described in, for example, U.S. Pat. Nos. 4,302,565 and 4,302,566.

Activator

The activator can be any compound or combination of compounds, supported or unsupported, which can activate the first metallocene, the second metallocene, and/or the non-metallocene, such as by creating a cationic species of the catalyst component. For example, this can include the abstraction of at least one leaving group (the "X" group in the metallocene catalyst compounds described herein) from the metal center of the catalyst compound/component.

The activator can include a Lewis acid or a non-coordinating ionic activator or ionizing activator, or any other compound including Lewis bases, aluminum alkyls, and/or conventional-type cocatalysts. The activator is preferably an aluminoxane, more preferably methylaluminoxane ("MAO"), or modified methylaluminoxane ("MMAO"), or a combination thereof. Other suitable activators can include, but are not limited to, aluminoxane or modified aluminoxane, and/or ionizing compounds, neutral or ionic, such as tri (n-butyl)ammonium tetrakis(pentafluorophenyl)boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O-subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum such as triisobutylaluminum. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

In one or more embodiments, a visually clear MAO can be used. For example, a cloudy and/or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt % to about a 50 wt % MAO, for example. Commercially available MAO solutions can include the 10 wt % and 30 wt % MAO solutions available from Albemarle Corporation, of Baton Rouge, La.

In some embodiments, one or more organo-aluminum compounds such as one or more trialkylaluminum compounds can be used in conjunction with the aluminoxanes. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like. Other alkylaluminum species that may be used are diethylaluminum ethoxide, diethylaluminum chloride, and/or diisobutylaluminum hydride. In some embodiments, the mixed catalyst system can be free or substantially free from any intentionally added organo-aluminum compounds. In other words, in at least one embodiment, the use of organo-aluminum compounds can be avoided or otherwise not intentionally added to the catalyst system.

In one or more embodiments, one or more ionizing or stoichiometric activators, neutral or ionic, can be used in combination with aluminoxane or modified aluminoxane. For example, tri (n-butyl) ammonium tetrakis (pentafluorophenyl) boron, a trisperfluorophenyl boron, or a trisperfluoronaphthyl boron, polyhalogenated heteroborane anions (WO 98/43983), boric acid (U.S. Pat. No. 5,942,459), or combinations thereof can be used. Examples of neutral stoichiometric activators can include tri-substituted boron, tellurium, aluminum, gallium, indium, or any combination thereof. The three substituent groups can each be independently selected from alkyls, alkenyls, halogen, substituted alkyls, aryls, arylhalides, alkoxy and halides. Preferred neutral stoichiometric activators include trisperfluorophenyl boron or trisperfluoronaphthyl boron.

The ratio of the activator to the first metallocene, the second metallocene, and/or the non-metallocene in the mixed catalyst system can range from about 1:1 to about 100,000:1, based on moles of activator to moles of metallocene. In another example, the amount of activator can range from about 10:1 to about 10,000:1, from about 50:1 to about 5,000: 1, or from about 100:1 to about 1,000:1 based on moles of activator to moles of the first metallocene, the second metallocene, or the non-metallocene. If the activator is an aluminoxane, the amount of the aluminoxane can be determined based on the amount of aluminum (Al) contained in the aluminoxane.

In some embodiments, the activator and the catalyst system are combined prior to introducing the catalyst system to the polymerization reactor. In other embodiments, the activator and the catalyst system are separately introduced to the polymerization reactor.

Support

The first metallocene, the second metallocene, and/or the non-metallocene can be supported or unsupported. As used herein, the terms "support" and "carrier" are used interchangeably and refer to any support material, including a porous support material, such as talc, inorganic oxides, and inorganic chlorides. Other supports can include resinous support materials such as polystyrene, functionalized or crosslinked organic supports, such as polystyrene divinyl benzene polyolefins or other polymeric compounds, or any other organic or inorganic support material and the like, or mixtures thereof.

The one or more catalyst compounds, e.g., the first metallocene, the second metallocene, and/or the non-metallocene, of the present disclosure can be supported on the same or separate supports together with the activator, or the activator can be used in an unsupported form, or can be deposited on a support different from the catalyst compound(s), or any combination thereof. This may be accomplished by any technique commonly used in the art. There are various other methods in the art for supporting a catalyst compound. For example, the catalyst compound can contain a polymer bound ligand as described in, for example, U.S. Pat. Nos. 5,473,202 and 5,770,755. The catalyst compounds can be spray dried as described in, for example, U.S. Pat. No. 5,648,310. The support used with the catalyst compound can be functionalized, as described in EP 0 802 203, or at least one substituent or leaving group is selected, as described in U.S. Pat. No. 5,688, 880.

The support can be or include one or more inorganic oxides. The support can be an inorganic oxide that includes one or more metal oxides of Group 2, 3, 4, 5, 13, or 14 elements. For example, the inorganic oxide can include, but is not limited to, silica, alumina, titania, zirconia, boron oxide, zinc oxide, magnesia, or any combination thereof. Illustrative combinations of inorganic oxides can include, but are not limited to, silica-alumina, silica-titania, silica-zirconia, silica-boron oxide, and the like. In at least one specific example, the support can be or include silica and/or alumina Supports that include two or more inorganic oxides can have any ratio or amount of each oxide, relative to one another, can be used. For example, an alumina-silica catalyst support can include from about 1 wt % alumina to about 99 wt % alumina, based on the total amount of alumina and silica. In one or more embodiments, an alumina-silica catalyst support can have an alumina concentration ranging from a low of about 2 wt %, about 5 wt %, about 15 wt %, or about 25 wt % to a high of about 50 wt %, about 60 wt %, about 70 wt %, or about 90 wt %, based on the total amount of alumina and silica. Suitable commercially available silica supports can include, but are not limited to, ES757, ES70, and ES70W available from PQ Corporation. Suitable commercially available silica-alumina supports can include, but are not limited to, SIRAL® 1, SIRAL® 5, SIRAL® 10, SIRAL® 20, SIRAL® 28M, SIRAL® 30, and SIRAL® 40, available from SASOL®.

A mixed inorganic oxide catalyst support can be prepared using any suitable method. For example, a silica catalyst support can be mixed, blended, contacted, or otherwise combined with one or more aluminum compounds to produce a silica support and aluminum compound(s) mixture. The silica catalyst support can be mixed with the one or more aluminum compounds in a water and/or alcohol solution and dried to produce the silica support and aluminum compound(s) mixture. Suitable alcohols can include, but are not limited to, alcohols having from 1 to 5 carbon atoms, and mixtures or combinations thereof. For example, the alcohol can be or include methanol, ethanol, propan-1-ol, propan-2-ol, and the like. Suitable aluminum compounds can include, but are not limited to, aluminum monoacetate $((HO)_2AlC_2H_3O_2)$, aluminum diacetate $(HOAl(C_2H_3O_2)_2)$, and aluminum triacetate $(Al(C_2H_3O_2)_3)$, aluminum hydroxide $(Al(OH)_3)$, aluminum diacetate hydroxide $(Al(OAc)_2OH)$, aluminum tri-acetylacetonate, aluminum fluoride $(AlF_3)$, sodium hexafluoroaluminate $(Na_3AlF_6)$, or any combination thereof.

The silica support and aluminum compound(s) mixture can be heated (calcined) in the presence of one or more inert gases, oxidants, reducing gases, or in any order/combination thereof to produce an alumina-silica catalyst support. As used herein, the term "oxidant" can include, but is not limited to, air, oxygen, ultra-zero air, oxygen/inert gas mixtures, or any combination thereof. Inert gases can include, but are not limited to, nitrogen, helium, argon, or combinations thereof. Reducing gases can include, but are not limited to, hydrogen, carbon monoxide, or combinations thereof.

The silica support and aluminum compound(s) mixture can be heated to a first temperature under nitrogen gas or other inert gas. After heating to the first temperature the nitrogen gas can be stopped, one or more oxidants can be introduced, and the temperature can be increased to a second temperature. For example, the silica support and aluminum compound(s) mixture can be heated under an inert atmosphere to a temperature of about 200° C., the oxidant can be introduced, and the mixture can then be heated to a temperature of from about 450° C. to about 1,500° C. to produce an alumina-silica catalyst support. The second temperature can range from a low of about 250° C., about 300° C., about 400° C., or about 500° C. to a high of about 600° C., about 650° C., about 700° C., about 800° C., or about 900° C. For example, the second temperature can range from about 400° C. to about 850° C., about 800° C. to about 900° C., about 600° C. to about 850° C., or about 810° C. to about 890° C. The silica support and aluminum compound(s) mixture can be heated and held at the second temperature for a period of time ranging from about 1 minute to about 100 hours. For example, the silica support and alumina compound(s) mixture can be heated and held at the second temperature for a time ranging from a low of about 30 minutes, about 1 hour, or about 3 hours, to a high of about 10 hours, about 20 hours, or about 50 hours. In one or more embodiments, the silica support and alumina compound(s) mixture can be heated from ambient temperature to the second or upper temperature without heating to an intermediate or first temperature. The silica support and alumina compound(s) mixture can be heated under a nitrogen or other inert atmosphere initially, which can be modified to include the one or more oxidants or the atmosphere can be or include the one or more oxidants at the initial heating from ambient temperature.

The support can be mixed, blended, contacted, or otherwise combined with one or more sources of halide ions, sulfate ions, or a combination of anions to produce an inorganic oxide catalyst support and anion mixture, which can be heated or calcined to produce an activated support. For example, one or more halide ion sources, sulfate ion sources, metal ion sources, or any combination thereof, can be dry mixed, i.e., mixed without the presence of a liquid or intentionally added liquid, with the inorganic oxide support. In another example, the one or more halide ion sources, sulfate ion sources, metal ion sources, or any combination thereof, can be wet mixed, i.e., in the presence of a liquid, with the inorganic oxide catalyst support. Illustrative liquids can include, but are not limited to, alcohols, water, or a combination thereof. Suitable alcohols can include, but are not limited to, alcohols having from 1 to 5 carbon atoms, and mixtures or combinations thereof. The mixture, either dry mixed or wet mixed, can be calcined to produce an activated support.

The activated support can include, but is not limited to, brominated silica, brominated silica-titania, fluorinated silica, fluorinated silica-alumina, fluorinated silica-zirconia, fluorinated-chlorinated silica, fluorinated silica-titania, chlorinated silica, sulfated silica, or any combination thereof. The support can be treated with one or more metal ions in addition to or in lieu of the one or more halide ion sources and/or sulfate ion sources. Illustrative metal ions can include, but are not limited to, copper, gallium, molybdenum, silver, tin, tungsten, vanadium, zinc, or any combination thereof. Suitable activated supports can include those discussed and described in WO Publication No. WO 2011/103402.

The support can have a surface area ranging from a low of about 1 $m^2/g$, about 50 $m^2/g$, or about 100 $m^2/g$ to a high of about 400 $m^2/g$, about 500 $m^2/g$, or about 800 $m^2/g$. The support can have a pore volume ranging from a low of about 0.01 $cm^3/g$, about 0.1 $cm^3/g$, about 0.8 $cm^3/g$, or about 1 $cm^3/g$ to a high of about 2 $cm^3/g$, about 2.5 $cm^3/g$, about 3 $cm^3/g$, or about 4 $cm^3/g$. The support can have an average particle size ranging from a low of about 0.1 μm, about 0.3 μm, about 0.5 μm, about 1 μm, about 5 μm about 10 μm, or about 20 μm to a high of about 50 μm, about 100 μm, about 200 μm, or about 500 μm. The average pore size of the support can range from about 10 Å to about 1,000 Å, preferably from about 50 Å to about 500 Å, and more preferably from about 75 Å to about 350 Å.

Suitable catalyst supports can be as discussed and described in Hlatky, Chem. Rev. (2000), 100, 1347 1376 and Fink et al., Chem. Rev. (2000), 100, 1377 1390, U.S. Pat. Nos.: 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664, and WO 95/32995, WO 95/14044, WO 96/06187, and WO 97/02297.

EXAMPLES

To provide a better understanding of the foregoing discussion, the following non-limiting examples are provided. All parts, proportions and percentages are by weight unless otherwise indicated.

Lab Stirred Gas Phase Polymerization Process

The gas phase batch reactor used was a 1.65 liter stainless steel autoclave equipped with a variable speed mechanical agitator. For maximum mixing, the reactor was operated at a 45 degree angle from its vertical position during polymerization. The reactor was first charged with about 400 g of NaCl. The NaCl was pre-dried at 150° C. under vacuum for 2 days. The reactor was dried by heating to about 100° C. under a stream of nitrogen for a minimum of 1 hour. After the reactor was dried, the temperature was lowered to about 80° C. and about 5 grams of silica supported methylaluminoxane (SMAO) was added as a scavenger. After adding the SMAO, the reactor was sealed and components were gently stirred. The reactor was then charged with hydrogen (3,000 ppm) and 1-hexene (C6/C2=0.004). The reactor was then pressurized to about 220 psi with ethylene. Once the reactor reached steady state, catalyst was charged into the reactor using a stainless steel bomb to start polymerization. After the catalyst was introduced, the reactor temperature was increased to about 100° C. and maintained for the polymerization. The polymerization was carried for about 60 minutes and during this time hydrogen, C6/C2 ratio and ethylene pressure remained constant. At the end of 60 minutes, the reactor was cooled down, vented and opened. The resulting mixture is then washed with water, methanol, and dried.

The catalyst system for comparative example 1 (CEx. 1) was supported and was prepared by adding about 21 milligrams ("mg") of (tetramethylcyclopentadienyl)(n-propylcyclopentadienyl)zirconium dichloride (($Me_4Cp$)(n-pr-Cp)$ZrCl_2$) as the catalyst to a mixture of about 0.304 grams toluene and about 6.3 grams mineral oil (Hydrobrite 380). About 1.04 grams of SMAO was then added to the mixture and the combined mixture was rolled for 20 hours at room temperature to obtain a homogeneous catalyst slurry with a metallocene loading of about 0.051 mmol/gram.

The catalyst system for Example 1 (Ex. 1) was supported and was prepared by repeating the preparation of CEx. 1 and adding about 60 mg of pentafluorophenol to the mixture of the ($Me_4Cp$)(n-pr-Cp)$ZrCl_2$ catalyst compound, toluene, Hydrobrite 380, and SMAO. The formation of small bubbles was observed when the pentafluorophenol was added to the catalyst. The mixture was rolled for 20 hours to produce a homogeneous catalyst slurry having a metallocene loading of about 0.052 mmol/gram.

The catalyst system for Example 2 (Ex. 2) was supported and was prepared by combining adding about 21 mg of the ($Me_4Cp$)(n-pr-Cp)$ZrCl_2$ catalyst and about 50 mg pentafluorophenol to with a mixture of about 0.307 grams toluene and about 6.35 grams Hydrobrite 380. The combined mixture was stirred for about 20 minutes and then about 1.04 grams SMAO was added. This combined mixture was then rolled for about 20 hours to produce a homogeneous catalyst slurry having a metallocene loading of about 0.048 mmol/gram.

The catalyst system for Comparative Example 2 (CEx. 2) was supported and was prepared by adding about 21 mg of (tetramethylcyclopentadienyl)(n-propylcyclopentadienyl) zirconium dimethyl (($Me_4Cp$)(n-pr-Cp)$ZrMe_2$) catalyst to about 6.19 grams Hydrobrite 380. The mixture was stirred for about 20 minutes and then about 1.193 grams SMAO was added. This combined mixture was then rolled for about 20 hours at room temperature to produce a homogeneous catalyst slurry having a metallocene loading of about 0.050 mmol/gram.

The catalyst system for Example 3 (Ex. 3) was supported and was prepared by adding about 19 mg of the ($Me_4Cp$)(n-pr-Cp)$ZrMe_2$ catalyst to about 6.147 grams Hydrobrite 380. About 12 mg pentafluorophenol was then added and the mixture was stirred for about 20 minutes. About 1.107 grams SMAO was then added and the combined mixture was rolled for about 20 hours at room temperature to produce a homogeneous catalyst slurry having a metallocene loading of about 0.049 mmol/gram.

The catalyst system for Example 4 (Ex. 4) was supported and was prepared according to the same procedure used to prepare Ex. 3 except that 40 mg pentafluorophenol was used. The catalyst system for Example 5 (Ex. 5) was prepared according to the same procedure used to prepare Ex. 3 except that 51 mg pentafluorophenol was used.

Table 1 below summarizes the catalyst activity for the lab stirred gas phase polymerization examples for CEx. 1 and 2 and Ex. 1-5.

TABLE 1

| Catalyst | PFP/Zr, mol/mol | Catalyst Activity (gPE/g catalyst system · hr) |
| --- | --- | --- |
| CEx. 1 | 0.0 | 2,722 |
| Ex. 1 | 6.1 | 4,058 |
| Ex. 2 | 5.1 | 4,250 |
| CEx. 2 | 0.0 | 2,558 |
| Ex. 3 | 1.2 | 3,945 |
| Ex. 4 | 3.2 | 6,221 |
| Ex. 5 | 4.6 | 7,143 |

As seen in Table 1, using a metallocene catalyst reacted with pentafluorophenol significantly increased the catalyst activity. The catalyst activity was measured in grams of polyethylene ("PE") per gram of catalyst system in one hour (gPE/g catalyst system·hr). In Example 2 where the metallocene was pre-mixed with the pentafluorphenol at a PFP/Zr molar ratio of 5.1, the productivity was increased as compared to CEx.1 from 2722 g/ghr to 4250 g/ghr, representing an increase of productivity of about 56%. In Example 1, where the metallocene was first dipped on SMAO and then the pentafluorphenol was added, the productivity also increased by about 49% as compared to CEx. 1. Thus, as seen by comparing Examples 1 and 2 which both used the same catalyst compound as comparative example CEx. 1, but for the reaction with pentafluorophenol, the use of the pentafluorophenol significantly increased the catalyst activity. Increases in catalyst activity can also be seen by comparing Examples 3, 4, and 5, to CEx. 2.

Lab Stirred Gas Phase Polymerization Process

The gas phase batch reactor used was the same as that used in CEx. 1 and 2 and Ex. 1-5. The metallocene catalysts, optionally with pentafluorophenol, were mixed in HB-380 mineral oil and directly injected into the reactor. The metallocene catalysts were not supported and only the approximately 5 grams SMAO introduced to the reactor was present.

The catalyst system of comparative example CEx. 3 was prepared by adding about 28 mg of the ($Me_4Cp$)(n-pr-Cp)$ZrMe_2$ catalyst to about 10 grams mineral oil (Hydrobrite 380) and the mixture was stirred for about 20 minutes. The catalyst solution had a metallocene loading of about 8 mmol/gram solution. About 0.0647 grams of catalyst solution was introduced directly to the reactor.

The catalyst system of Ex. 6 was prepared by adding about 28 mg of the ($Me_4Cp$)(n-pr-Cp)$ZrMe_2$ catalyst and 15 mg of pentafluorophenol to about 10.1 grams mineral oil (Hydrobrite 380). The mixture was stirred for about 20 minutes. The catalyst solution had a metallocene loading of about 7.9 mmol/gram. About 0.0608 grams of catalyst solution was introduced to the reactor.

The catalyst system of Ex. 7 was prepared by adding about 27 mg of the ($Me_4Cp$)(n-pr-Cp)$ZrMe_2$ catalyst and 32 mg of pentafluorophenol to about 10.1 grams mineral oil (Hydrobrite 380) and the mixture was stirred for about 20 minutes. The catalyst solution had a metallocene loading of about 7.6 mmol/gram. About 0.0664 grams of catalyst solution was introduced to the reactor.

The catalyst system of Ex. 8 was prepared by dissolving about 0.5 grams (about 1.43 mmol) ($Me_4Cp$)(n-pr-Cp)$ZrMe_2$ in about 10 ml of hexane to produce a first solution (Solution A). About 0.529 grams (about 2.86 mmol) pentafluorophenol was also dissolved in about 10 ml of hexane to produce a second solution (Solution B). Solution B was slowly added to Solution A over a time period of about 10 min. The mixture was stirred for about 2 hours. The solvent was removed under reduced pressure to obtain about 0.98 grams of $(Me_4Cp)(n-pr-Cp)Zr(OC_6F_5)_2$ as white solid. $^1H$ NMR ($C_6D_6$, 400 MHz, 25° C.): δ 0.57 (t, 3H, $CH_2CH_2CH_3$), 1.24 (m, 2H, $CH_2CH_2CH_3$), 1.65 (s, 6H, $CH_3$ on cyclopentadienyl ring), 1.77 (s, 6H, $CH_3$ on cyclopentadienyl ring), 2.14 (t, 2H, $CH_2CH_2CH_3$), 5.45(s, 1H, cyclopentadienyl ring), 5.77(s, 4H, cyclopentadienyl ring). 19F NMR (C6D6, 400 MHz, 25° C.): δ −173.2(t, 1F), −166.4(t, 2F), −163.2(d, 2F). About 55 mg of $(Me_4Cp)(n-pr-Cp)Zr(OC_6F_5)_2$ was then mixed with about 10 grams mineral oil (Hydrobrite 380), stirred for about 3 hours to obtain a homogeneous solution. About 0.0684 grams of the solution was introduced to the reactor.

The catalyst system of Ex. 9 was prepared by dissolving about 1 gram (about 2.56 mmol) $(Me_4Cp)(n-pr-Cp)ZrCl_2$ and about 0.943 grams (about 5.12 mmol) pentafluorophenol in about 40 ml of toluene. About 1.43 ml (about 10.24 mmol) of triethylamine was then added dropwise at room temperature and precipitation occurred. The mixture was stirred for about 2 hours at room temperature followed by filtration to remove the solid phase. The filtrate was evaporated to dryness under reduced pressure to obtain about 1.56 grams of $(Me_4Cp)(n-pr-Cp)Zr(OC_6F_5)_2$ as white solid. $^1H$ NMR ($C_6D_6$, 400 MHz, 25° C.): δ 0.57 (t, 3H, $CH_2CH_2CH_3$), 1.24 (m, 2H, $CH_2CH_2CH_3$), 1.65(s, 6H, $CH_3$ on cyclopentadienyl ring), 1.77(s, 6H, $CH_3$ on cyclopentadienyl ring), 2.14(t, 2H, $CH_2CH_2CH_3$), 5.45(s, 1H, cyclopentadienyl ring), 5.77 (s, 4H, cyclopentadienyl ring). 19F NMR (C6D6, 400 MHz, 25° C.): δ −173.2(t, 1F), −166.4(t, 2F), −163.2(d, 2F). About 55 mg of $(Me_4Cp)(n-pr-Cp)Zr(OC_6F_5)_2$ was then mixed with about 10 grams mineral oil (Hydrobrite 380), stirred for about 3 hours to obtain a homogeneous solution. 0.0617 gram of solution was introduced to the reactor.

Table 2 below summarizes the catalyst activity for the lab stirred gas phase polymerization for CEx. 3 and Ex. 6-9.

TABLE 2

| Catalyst | | C6F5OH/Zr, mol/mol | Catalyst Activity (gPE/ mmolCat · hr) |
|---|---|---|---|
| CEx. 3 | $(Me_4Cp)(n-pr-Cp)ZrMe_2$ | 0.0 | 141,615 |
| Ex. 6 | $(Me_4Cp)(n-pr-Cp)ZrMe_2$ + $C_6F_5OH$ | 1.0 | 198,209 |
| Ex. 7 | $(Me_4Cp)(n-pr-Cp)ZrMe_2$ + $C_6F_5OH$ | 2.2 | 238,407 |
| Ex. 8 | $(Me_4Cp)(n-pr-Cp)Zr(OC_6F_5)_2$ | 2.0 | 257,127 |
| Ex. 9 | $(Me_4Cp)(n-pr-Cp)Zr(OC_6F_5)_2$ | 2.0 | 256,323 |

As in the above examples, the metallocene catalyst introduced with or pre-reacted with pentafluorophenol exhibited significantly increased catalyst activity. Catalyst activity was measured in grams of polyethylene ("PE") per mmol of metallocene catalyst in one hour (gPE/gCat·hr). As can be seen in Table 2, the catalyst activity for Ex. 6 was about 40% greater than the comparative example CEx. 3, the catalyst activity for Ex. 7 was about 68.3% greater than the comparative example CEx. 3, the catalyst activity for Ex. 8 was about 81.5% greater than the comparative example CEx. 3, and the catalyst activity for Ex. 9 was about 81.0% greater than the comparative example CEx. 3.

Pilot Plant Gas Phase Fluidized Bed Polymerization Process

A mixed catalyst system that produced bimodal polyethylene was evaluated using a pilot plant gas phase polymerization process. The polymerization reactions were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as the comonomer and was introduced at a hexnene:ethylene molar ratio of 0.004. The individual flow rates of ethylene, hydrogen and comonomer were controlled to maintain fixed composition targets. The ethylene concentration was controlled to maintain a constant ethylene partial pressure. The hydrogen was controlled to maintain hydrogen concentration of about 3,000 ppm. The concentrations of all the gases were measured by an on-line gas chromatograph to ensure relatively constant composition in the recycle gas stream. For comparative example CEx. 5 and Ex. 11, a continuity aid was also introduced to the fluidized bed reactor in an amount of about 40 ppm, based on the weight of all feeds to the reactor, excluding recycle. The continuity aid was a 1:1 mixture of bis(2-hydroxyethyl) stearyl amine and aluminum distearate that was slurried in mineral oil (Hydrobrite 380) to have total slurry concentration of approximately 20 wt %. No continuity aid was used for CEx. 4 and Ex. 10.

In comparative examples CEx. 4 and CEx. 5 the metallocene catalyst compound was $(Me_4Cp)(n-pr-Cp)ZrMe_2$ and was used as a solution trim catalyst in conjunction with a mixture of a non-metallocene catalyst, i.e., $[(2,3,4,5,6-Me_5C_6)NCH_2CH_2]_2NHZrBz_2$ and a second metallocene catalyst, i.e., $(Me_4Cp)(n-pr-Cp)ZrCl_2$. The molar ratio of the non-metallocene to second metallocene was about 3:1. In Examples 10 and 11 the trim catalyst was the metallocene $(Me_4Cp)(n-pr-Cp)Zr(OC_6F_5)_2$ and was used in conjunction with the same mixture of the non-metallocene and the second metallocene catalyst used in comparative examples CEx. 4 and CEx. 5. For all four examples, the $[(2,3,4,5,6-Me_5C_6)NCH_2CH_2]_2NHZrBz_2$ catalyst and the $(Me_4Cp)(n-pr-Cp)ZrCl_2$ catalyst was a spray dried powdered catalyst system. The polymer product produced in all four examples (CEx. 4, CEx. 5, Ex. 10, and Ex. 11) was a bimodal polyethylene.

The non-metallocene catalyst, i.e., $[(2,3,4,5,6-Me_5C_6)NCH_2CH_2]_2NHZrBz_2$, produced the high molecular weight fraction of the bimodal polyethylene and the metallocene component, i.e., the $(Me_4Cp)(n-pr-Cp)ZrCl_2$ and, when present, the $(Me_4Cp)(n-pr-Cp)Zr(OC_6F_5)_2$, produced the low molecular weight fraction of the bimodal polyethylene. The major part of the bimodal polyethylene was produced by the trim catalyst which was fed in-line to mix with the non-metallocene catalyst before entering the reactor. The use of trim catalyst provides good control of the split of molecular weight based on product need. In the pilot plant experiment, the solid catalyst feed rate was constant and the trim catalyst feed rate was adjusted to produce the target bimodal polyethylene. The polymerization results are summarized in Table 3 below.

TABLE 3

| Example | Metallocene Trim Catalyst | HN5/$2^{nd}$ Metallocene Ratio | Flow Index ($I_5$) | Melt Index Ratio ($I_{21}/I_5$) | Density |
|---|---|---|---|---|---|
| CEx. 4 | $(Me_4Cp)(n-pr-Cp)ZrMe_2$ | 0.852 | 0.166 | 38.9 | 0.9487 |
| Ex. 10 | $(Me_4Cp)(n-pr-Cp)Zr(OC_6F_5)_2$ | 1.251 | 0.165 | 36.6 | 0.9480 |

TABLE 3-continued

| Example | Metallocene Trim Catalyst | HN5/2$^{nd}$ Metallocene Ratio | Flow Index ($I_5$) | Melt Index Ratio ($I_{21}/I_5$) | Density |
|---|---|---|---|---|---|
| CEx. 5 | (Me$_4$Cp)(n-pr-Cp)ZrMe$_2$ | 0.549 | 0.164 | 38.1 | 0.9491 |
| Ex. 11 | (Me$_4$Cp)(n-pr-Cp)Zr(OC$_6$F$_5$)$_2$ | 0.669 | 0.158 | 37.8 | 0.9489 |

When the trim metallocene catalyst is more active, less trim catalyst is needed to achieve the target product and can be quantified by the HN5/Metallocene ratio. Higher HN5/Metallocene ratio means more active trim catalyst. The data shown in Table 3 above confirmed that (Me$_4$Cp)(n-pr-Cp)Zr(OC$_6$F$_5$)$_2$ is more active than (Me$_4$Cp)(n-pr-Cp)ZrMe$_2$. The metallocene catalyst having the pentafluorphenoxy leaving groups (Ex. 10 and Ex. 11) showed an increase in catalyst productivity as compared to the metallocene catalyst not reacted with pentafluorophenol (CEx. 4 and CEx. 5, respectively).

Lab Stirred Gas Phase Polymerization Process

In C.Ex. 6 and 7 and Examples 12-15, spray-dried catalysts were used with the gas phase batch reactor that was used in CEx. 1 and 2 and Ex. 1-5. The spray-dried catalysts were prepared on a bench-scale Buchi spray drier.

In C.Ex. 6 Cabosil silica was first suspended in toluene in a bottle with a stir bar. MAO was added to the mixture and was allowed to mix overnight. (Me$_4$Cp)(n-pr-Cp)ZrCl$_2$ catalyst was then added to the Cabosil/MAO slurry, which was then stirred for 30 minutes. The non-metallocene catalyst, i.e., [(2,3,4,5,6-Me$_5$C$_6$)NCH$_2$CH$_2$]$_2$NHZrBz$_2$ was then added to the mixture to achieve a ratio of non-metallocene to metallocene of 2 mol/mol, the mixture was then stirred for 5 to 15 minutes before spray drying. The catalyst slurry was fed to the spray head of the Buchi spray drier at a rate of 3-4 ml/minute and a nitrogen atomizer was used to disperse the material through the tip. The spray drying temperature was 15-20° C. above the flash point of the solvent (i.e., the toluene). Upon flashing off the solvent, the solid catalyst material was collected for use in the polymerization process.

In Examples 12-14 Cabosil silica was first suspended in toluene in a bottle with a stir bar. MAO was added to the mixture and was allowed to mix overnight. (Me$_4$Cp)(n-pr-Cp)ZrCl$_2$ catalyst and pentafluorophenol were mixed and stirred for 20 minutes in a separate bottle. The metallocene/PFP mixture was then added to the Cabosil/MAO slurry, which was then stirred for 30 minutes. The non-metallocene catalyst, i.e., [(2,3,4,5,6-Me$_5$C$_6$)NCH$_2$CH$_2$]$_2$NHZrBz$_2$ was then added to the mixture, which was then stirred for 5 to 15 minutes before spray drying. The formulation used for these examples was MAO (20%) 21 g; non-metallocene 0.22 g; (Me$_4$Cp)(n-pr-Cp)ZrCl$_2$ 0.065 g; PFP amount varied depending upon the ratio noted in Table 4; Cabosil 5.6 g; toluene 200 g. This formulation gave molar ratios of non-metallocene/(Me$_4$Cp)(n-pr-Cp)ZrCl$_2$ of 2, Al/Zr of 140, and yielded about 10 g of solid catalyst. The catalyst slurry was fed to the spray head of the Buchi spray drier at a rate of 3-4 ml/minute and a nitrogen atomizer was used to disperse the material through the tip. A small plunger was pushed through the tip every 7 to 10 seconds to keep the tip clean. The spray drying temperature was 15-20° C. above the flash point of the solvent (i.e., the toluene). Upon flashing off the solvent, the solid catalyst material was collected for use in the polymerization process. Example 14 was a repeat run of Example 12 conducted 8 days after Example 12 was polymerized using left over catalyst from the manufacture of the catalyst for Example 12.

C.Ex.7 used an oil slurry of the spray-dried catalyst that was used in C.Ex. 6. Example 15 used the same oil slurry as in C.Ex. 7 except that pentafluorphenol was added to the slurry and allowed to mix before introducing the slurried catalyst system into the reactor.

The polymerization results of CEx. 6, C.Ex.7, and Examples 12-15 are shown in Table 4.

TABLE 4

| Catalyst | MCN/PFP Ratio (mol/mol) | Cat. Used (g) | Polymer Yield (g) | Catalyst Activity (gPE/g catalyst system · hr) |
|---|---|---|---|---|
| CEx. 6 | 0 | 0.0094 | 65.1 | 6925 |
| Ex. 12 | 5 | 0.0080 | 75.2 | 9400 |
| Ex. 13 | 8 | 0.0074 | 45 | 6081 |
| Ex. 14 | 5 | 0.0062 | 54.4 | 8774 |
| CEx. 7 | 0 | 0.0777 g slurry | 63.0 | 5727 |
| Ex. 15 | — | 0.0664 g slurry | 56.4 | 6197 |

The polymerization results in Table 4, show that Example 12 which used a (Me$_4$Cp)(n-pr-Cp)ZrCl$_2$/PFP ratio of 5 showed significantly higher activity (9400 g/ghr) as compared to CEx 6 (6925 g/g/hr). This result was verified by a repeat run (Example 14), which still showed an increase in catalyst activity as compared to C.Ex. 6 even though the catalyst had aged at room temperature for 8 days. Without being bound by theory, it is believed that the decrease in activity seen in Example 13 as compared to C.Ex. 6 is due to an overdosage of the PFP during the catalyst preparation, such that when PFP is used in large amounts the PFP not only replaced leaving groups of the metallocene but also caused some cleavage of the [(2,3,4,5,6-Me$_5$C$_6$)NCH$_2$CH$_2$]$_2$NHZrBz$_2$ ligand thus reducing the activity of the non-metallocene component and thus, reducing the activity of the overall catalyst system.

A comparison of Example 15 and C.Ex. 7 also demonstrated an increase in catalyst activity when PFP was allowed to mix with the catalyst slurry used.

Evaluation of PFP and Hafnium-Based Metallocenes

In C.Ex. 8, a hafnium-based metallocene catalyst was prepared as follows. 2 grams of Ineos 757-875 silica was slurried in 5 ml of toluene. In a separate container 48 mg (0.113 mmol) of bis(propylcyclopentadienyl) hafnium dimethyl (HfPMe$_2$) was dissolved in 2 mol of toluene. 8.33 ml of MAO solution (10 wt % in toluene, 12.5 mml) was then added to the HfPMe$_2$ solution. The MAO/HfPMe$_2$ solution was stirred at room temperature for 20 minutes and then added to the silica slurry, which was then stirred at 50° C. for 30 minutes. The solvent was then evaporated and the solid catalyst dried under high vacuum at 50° C. for 1 hour and then at room temperature for 30 minutes. The dried supported hafnium metallocene had a Hf and Al content as noted in Table 5.

In Examples 16-18 a PFP/Hf-metallocene was prepared as follows. 2 grams of Ineos 757-875 silica was slurried in 5 ml of toluene. In a separate container 48 mg (0.113 mmol) of HfPMe$_2$ was dissolved in 2 mol of toluene and mixed with varying amounts of PFP (0.1M in toluene) as noted in Table 5 for 20 minutes. To this solution 8.33 ml of MAO solution (10 wt % in toluene, 12.5 mml) was added, the resulting solution was then stirred at room temperature for 20 minutes. The mixture was then added to the silica slurry, which was stirred at 50° C. for 30 minutes. The solvent was then evaporated and the solid catalyst dried under high vacuum at 50° C. for 1 hour and then at room temperature for 30 minutes. The dried supported catalysts had a Hf content and an Al content as noted in Table 5.

The catalysts of C.Ex 8 and Examples 16-17 were tested under slurry polymerization conditions. Slurry polymerization was carried out in a 1 L autoclave reactor using isobutene (500 mL) as the diluents. The reactor was pre-dried and charged with the diluents and TIBA as a scavenger. Ethylene (200 psi) and 1-hexene comonomer (10 ml) were introduced into the reactor which was brought up to a temperature of 90° C. prior to the addition of catalyst. The polymerization was typically carried about for about 60 minutes. At the end of the polymerization reaction, the diluents and unreacted monomer were vented. The polymer was collected, dried and weighed to calculate the yield. The polymerization results are shown in Table 5.

TABLE 5

| Catalyst | Hf Content (wt %) | Al Content (wt %) | PFP/Hf Ratio (mol/mol) | Cat. Used (g) | Polymer Yield (g) | Catalyst Activity (gPE/g catalyst system · hr) |
|---|---|---|---|---|---|---|
| C. Ex. 8 | 0.68 | 11.9 | 0 | 0.06 | 208 | 3698 |
| Ex 16 | 0.71 | 12.0 | 1 | 0.05 | 198 | 3973 |
| Ex 17 | 0.72 | 11.5 | 2 | 0.04 | 185 | 4206 |
| Ex 18 | 0.71 | 11.4 | 4 | 0.04 | 192 | 4891 |

As shown in Table 5, the metallocene catalysts that were modified by PFP had higher productivity (up to 30% higher) as compared to the base hafnium catalyst of C.Ex. 8.

C.Ex. 9 and Example 19 tested catalysts in a gas phase reactor. C. Ex. 9 used the same catalyst as C. Ex. 8 and Example 19 used the same catalyst as Example 18. The gas phase polymerization was carried out in a 1.65 liter, stainless steel autoclave equipped with a variable speed mechanical agitator. For maximum mixing, the reactor was operated at a 45° angle from its vertical polymerization during polymerization. The reactor was first charged with 400 g of NaCl (pre-dried at 150° C. under vacuum for 2 days) and dried by heating at 100° C. under a stream of nitrogen for a minimum of one hour. After drying the reactor, the temperature was lowered to 80° C. to introduce 5 g of SMAO as a scavenger with help of nitrogen pressure. After adding the SMAO the reactor was sealed and the components were gently stirred. The reactor was then charged with 400-450 ppm hydrogen and 1-hexene (C6/C2=0.017), and pressurized with 220 psi of ethylene. Once the system reached a steady state the catalyst was introduced into the reactor using a stainless steel bomb to start polymerization. The reactor temperature was then increased to 85° C. which was maintained throughout the polymerization process. The polymerization reaction ran for about 60 minutes, and during this time the hydrogen, C6/C2, and ethylene pressure remained constant. At the end of the polymerization the reactor was cooled, vented, and opened. The resulting polymer mixture was then washed with water, methanol, and dried.

As seen in Table 6, in addition to the enhanced productivity, the analysis of the resulting polymer also indicated that the MFR of the produced polymer was not substantially altered by the use of the PFP as compared to the Me leaving group.

A final set of examples was performed to assess the effect of PFP on the "in-situ" formed catalyst. In C. Ex. 10 the HfPMe$_2$ catalyst of C. Ex. 8 was slurried in mineral oil, and the mineral oil slurry was directly injected into a gas phase reactor which was operated as described above with reference to C. Ex. 9 and Ex. 19. The catalyst was activated in-situ with the SMAO in the reactor. In Examples 20-23, PFP was allowed to react with the HfPMe$_2$ catalyst of C. Ex. 8 in mineral oil; the mineral oil slurry was then directly injected into a gas phase reactor which was operated as described above with reference to C. Ex. 9 and Ex. 19. The catalyst was activated in-situ with the SMAO in the reactor. The polymerization results are described in Table 7.

TABLE 7

| Catalyst | PFP/Hf Ratio (mol/mol) | Cat. Slurry Used (g) | Polymer Yield (g) | Catalyst Activity (gPE/mmol catalyst system · hr) |
|---|---|---|---|---|
| C. Ex. 10 | 0 | 0.0648 | 106 | 75140 |
| Ex. 20 | 2 | 0.0662 | 175 | 122783 |
| Ex. 21 | 5 | 0.0587 | 140 | 110766 |
| Ex. 22 | 10 | 0.0616 | 160 | 120650 |
| Ex. 23 | 20 | 0.0622 | 162 | 120970 |

As described in Table 7, as compared to C. Ex. 10, an about 60% increase of productivity was achieved by adding PFP to the catalyst slurry at a PFP/Hf ratio of 2. While Examples 21-23 showed increased productivity as compared to C.Ex. 10, increasing the ratio of PFP/Hf above 2 did not result in any further increases in productivity as compared to Example 20.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

TABLE 6

| Catalyst | PFP/Hf Ratio (mol/mol) | Cat. Used (g) | Polymer Yield (g) | Catalyst Activity (gPE/g catalyst system · hr) | I$_{21}$ | I$_5$ | I$_2$ | MFR (I$_{21}$/I$_2$) |
|---|---|---|---|---|---|---|---|---|
| C. Ex. 9 | 0 | 0.0151 | 85 | 5629 | 29.85 | 3.56 | 1.238 | 24.1 |
| Ex. 19 | 4 | 0.015 | 96 | 6400 | 49.51 | 5.71 | 2.006 | 24.7 |

What is claimed is:

1. A method for producing a polyolefin, comprising:
contacting one or more olefins with a catalyst system in a polymerization reactor at conditions sufficient to produce a polyolefin, wherein the catalyst system comprises
a first metallocene catalyst compound comprising:
a first transition metal atom;
two cyclopentadienyl ligands bound to the first transition metal atom, and
two leaving groups bound to the first transition metal atom, wherein at least one leaving group is selected from the group consisting of a halo-phenoxy and a halo-alkoxy;
wherein the first metallocene catalyst compound is selected from (tetramethylcyclopentadienyl)(n-propyl-cyclopentadienyl)zirconium bis(pentafluorophenoxide); bis(n-butylcyclopentadienyl) zirconium bis(pentafluorophenoxide); bis(n-propylcyclopentadienyl) hafnium bis(pentafluorophenoxide); bis(3-n-butyl-1-methyl cyclopentadienyl) zirconium bis(pentafluorophenoxide); rac-Me$_2$Si(tetrahydroindenyl)$_2$Zr bis (pentafluorophenoxide); or any combination thereof; and
wherein the first metallocene catalyst compound has a catalyst productivity that is at least 20% greater than a comparative metallocene catalyst compound used to produce the same polyolefin at the same conditions, wherein the comparative metallocene catalyst compound is the same as the first metallocene catalyst compound but does not have a leaving group that is a halo-phenoxy or a halo-alkoxy and instead has methyl leaving groups.

2. The method of claim 1, wherein the method is used to produce a bimodal polyolefin and the catalyst system further comprises at least one of a non-metallocene catalyst compound and a second metallocene compound.

3. The method of claim 1, wherein the catalyst system further comprises a non-metallocene catalyst compound which comprises a second transition metal atom and a ligand comprising at least one Group 14, 15, or 16 atom, wherein the Group 14, 15, or 16 atom is bound to the second transition metal.

4. The method of claim 1, wherein the catalyst system further comprises a non-metallocene catalyst compound which has the formula:

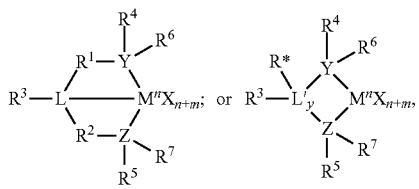

wherein M is a Group 3 to 12 transition metal or a Group 13 or 14 main group metal; each X is independently an anionic leaving group; y is 0 or 1; n is the oxidation state of M; m is the formal charge of the ligand represented by YZL or YZL'; L is a Group 15 or 16 element; L' is a group 15 or 16 element or Group 14 containing group; Y is a Group 15 element; Z is a Group 15 element; R$^1$ and R$^2$ are independently a C$_1$ to C$_{20}$ hydrocarbon group, a heteroatom containing group having up to twenty carbon atoms, silicon, germanium, tin, lead, or phosphorus; R$^1$ and R$^2$ may be interconnected to each other; R$^3$ is absent, a hydrocarbon group, hydrogen, a halogen, or a heteroatom containing group; R$^4$ and R$^5$ are independently an alky group, an aryl group, a substituted aryl group, a cyclic alkyl group, a substituted cyclic alkyl group, a cyclic arylalkyl group, a substituted cyclic arylalkyl group, or a multiple ring system; R$^4$ and R$^5$ may be interconnected to each other; R$^6$ and R$^7$ are independently absent, hydrogen, an alkyl group, a halogen, a heteroatom, or a hydrocarbyl group; and R* is absent, hydrogen, a Group 14 atom containing group, a halogen, or a heteroatom containing group.

5. The method of claim 3, wherein a molar ratio of the non-metallocene catalyst compound to the first metallocene catalyst compound is from about 0.05 to about 20 and the molar ratio is greater than a molar ratio of a comparative mixed catalyst system for making the same bimodal polyolefin, wherein the comparative mixed catalyst system contains the same non-metallocene catalyst compound and the comparative metallocene catalyst compound.

6. The method of claim 1, wherein the catalyst system further comprises a second metallocene catalyst compound that has the formula:

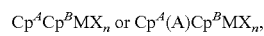

wherein M is a Group 4, 5 or 6 atom; Cp$^A$ and Cp$^B$ are each bound to M and are independently selected from the group consisting of cyclopentadienyl ligands, substituted cyclopentadienyl ligands, ligands isolobal to cyclopentadienyl and substituted ligands isolobal to cyclopentadienyl; (A) is a divalent bridging group bound to both Cp$^A$ and Cp$^B$ selected from the group consisting of divalent C$_1$ to C$_{20}$ hydrocarbyls and C$_1$ to C$_{20}$ heteroatom containing hydrocarbonyls, wherein the heteroatom containing hydrocarbonyls comprise from one to three heteroatoms; X is a leaving group selected from the group consisting of chloride ions, bromide ions, C$_1$ to C$_{10}$ alkyls, and C$_2$ to C$_{12}$ alkenyls, carboxylates, acetylacetonates, alkoxides, a halo-phenoxy, and a halo-alkoxy; and n is an integer from 1 to 3.

7. The method of claim 3, wherein the first metallocene catalyst compound and the non-metallocene catalyst compound are introduced independently to the polymerization reactor to produce the mixed catalyst system within the polymerization reactor.

8. The method of claim 3, wherein the non-metallocene catalyst compound is combined with a second metallocene catalyst compound to form a non-metallocene/second metallocene catalyst mixture, which is introduced to the polymerization reactor independently of the first metallocene catalyst compound.

9. The method of claim 8, further comprising adjusting the amount of the first metallocene catalyst compound introduced to the polymerization reactor relative to the non-metallocene/second metallocene catalyst mixture.

10. The method of claim 3, wherein the first metallocene catalyst compound and the non-metallocene catalyst compound are combined with one another external to the polymerization reactor to produce the mixed catalyst system which is introduced to the polymerization reactor.

11. The method of claim 10, further comprising introducing a second metallocene catalyst compound to the polymerization reactor independently of the mixed catalyst system.

12. The method of claim 3, wherein a molar ratio of the non-metallocene catalyst compound to the first metallocene catalyst compound ranges from about 0.2 to about 5.

13. A method for producing a bimodal polyolefin, comprising:
contacting one or more olefins with a mixed catalyst system in a polymerization reactor at conditions sufficient to produce a bimodal polyolefin, the mixed catalyst system comprising a first metallocene catalyst compound and a non-metallocene catalyst compound,
wherein the first metallocene catalyst compound comprises:
a first transition metal atom;
two cyclopentadienyl ligands bound to the first transition metal atom, and
two leaving groups bound to the first transition metal atom, wherein at least one leaving group is selected from the group consisting of a halophenoxy and a halo-alkoxy;
wherein the non-metallocene catalyst compound comprises a second transition metal atom and a ligand comprising at least one Group 14, 15, or 16 atom, wherein the Group 14, 15, or 16 atom is bound to the second transition metal; and
wherein a molar ratio of the non-metallocene catalyst compound to the first metallocene catalyst compound is from about 0.05 to about 20 and the molar ratio is greater than a molar ratio of a comparative mixed catalyst system for making the same bimodal polyolefin at the same conditions, wherein the comparative mixed catalyst system contains the same non-metallocene catalyst compound and the same first metallocene catalyst compound but does not have a leaving group that is a halo-phenoxy or a halo-alkoxy and instead has methyl leaving groups, and
wherein the first metallocene catalyst compound has a catalyst productivity that is at least 20% greater than the comparative metallocene catalyst compound used to produce the same polyolefin at the same conditions, wherein the comparative metallocene catalyst compound is the same as the first metallocene catalyst compound but does not have a leaving group that is a halo-phenoxy or a halo-alkoxy and instead has methyl leaving groups.

* * * * *